United States Patent
Hotta et al.

(10) Patent No.: US 7,443,110 B2
(45) Date of Patent: Oct. 28, 2008

(54) DISCHARGE LAMP ENERGIZING CIRCUIT AND METHOD OF ENERGIZING DISCHARGE LAMP

(75) Inventors: Souzaburou Hotta, Nagoya (JP); Takayuki Sekiya, Nissin (JP); Takeshi Sakuma, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 385 days.

(21) Appl. No.: 11/431,529

(22) Filed: May 11, 2006

(65) Prior Publication Data

US 2006/0255750 A1 Nov. 16, 2006

(30) Foreign Application Priority Data

May 13, 2005 (JP) ............... 2005-141645

(51) Int. Cl.
*H05B 37/02* (2006.01)

(52) U.S. Cl. .................. 315/291; 315/224; 315/307

(58) Field of Classification Search ............. 315/209 R, 315/219, 224, 244, 276, 291, 307; 363/28, 363/161–165
See application file for complete search history.

(56) References Cited

U.S. PATENT DOCUMENTS

| | | | | |
|---|---|---|---|---|
| 4,956,584 A | * | 9/1990 | Sikora ................. | 315/241 R |
| 6,490,177 B1 | * | 12/2002 | Figueroa ................. | 363/21.03 |
| 6,693,393 B2 | * | 2/2004 | Konishi et al. ............. | 315/224 |
| 7,176,638 B2 | * | 2/2007 | Ito et al. ..................... | 315/307 |
| 2003/0209993 A1 | | 11/2003 | Ito et al. | |
| 2003/0230938 A1 | | 12/2003 | Hatano et al. | |

FOREIGN PATENT DOCUMENTS

| | | | |
|---|---|---|---|
| JP | A 2003-133096 | 5/2003 |
| JP | A 2003-272887 | 9/2003 |
| JP | A 2004-72992 | 3/2004 |
| JP | A 2004-72994 | 3/2004 |

\* cited by examiner

*Primary Examiner*—Douglas W. Owens
*Assistant Examiner*—Jimmy T Vu
(74) *Attorney, Agent, or Firm*—Oliff & Berridge, PLC

(57) ABSTRACT

A discharge lamp energizing circuit has a pulse generating circuit and a control circuit. The pulse generating circuit has a DC power supply unit, and a transformer, a first semiconductor switch, and a second semiconductor switch which are connected in series across the DC power supply unit. The control circuit has a switching control circuit and a frequency setting circuit. The frequency setting circuit has a voltage-to-frequency converting circuit for converting an input voltage into a frequency signal, a frequency information table recorded in a memory, for example, and storing data representative of changes in the input voltage per unit time, a data reading circuit for successively reading the stored data from the frequency information table, and a voltage control circuit for modulating the input voltage based on the read data.

20 Claims, 36 Drawing Sheets

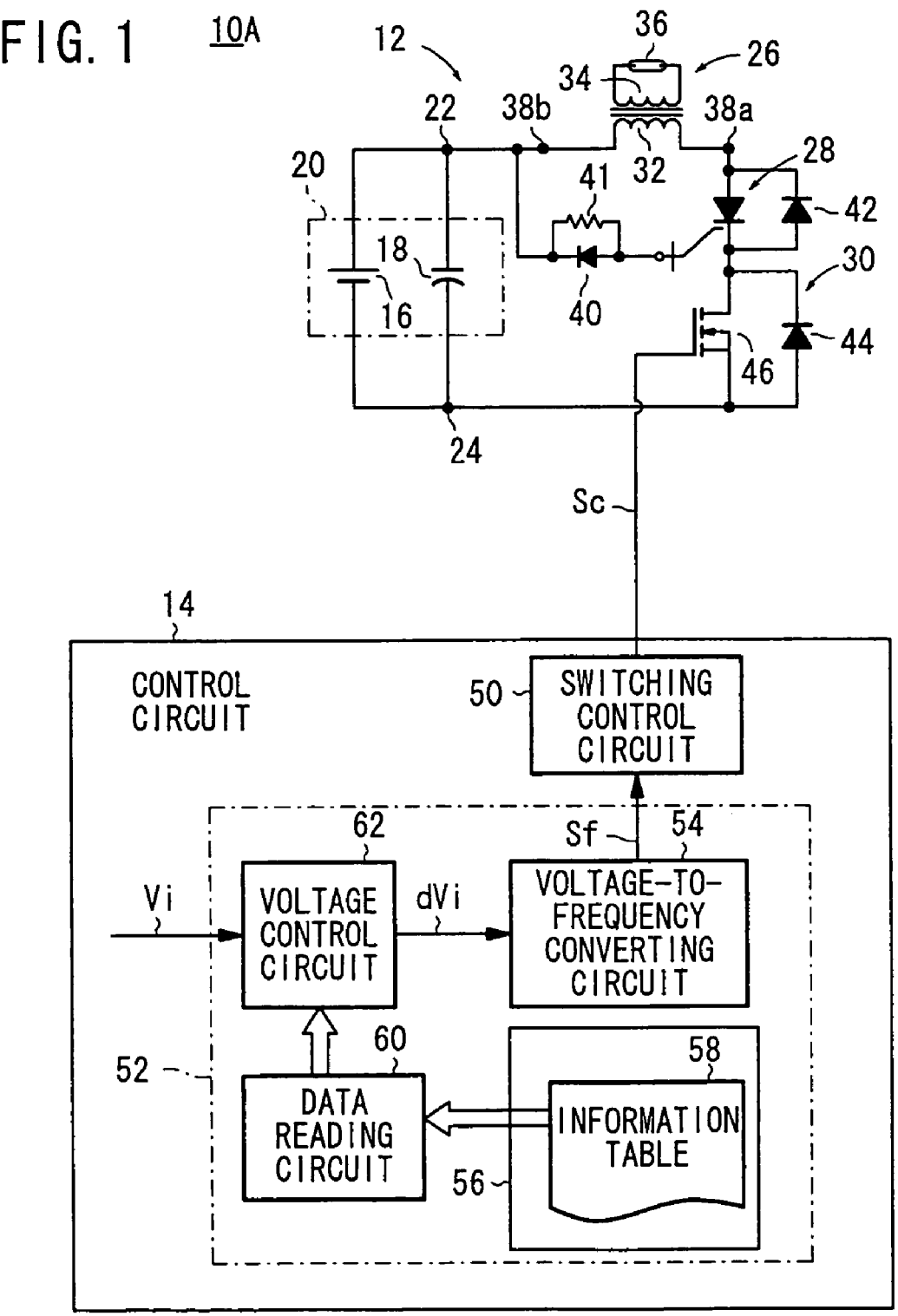

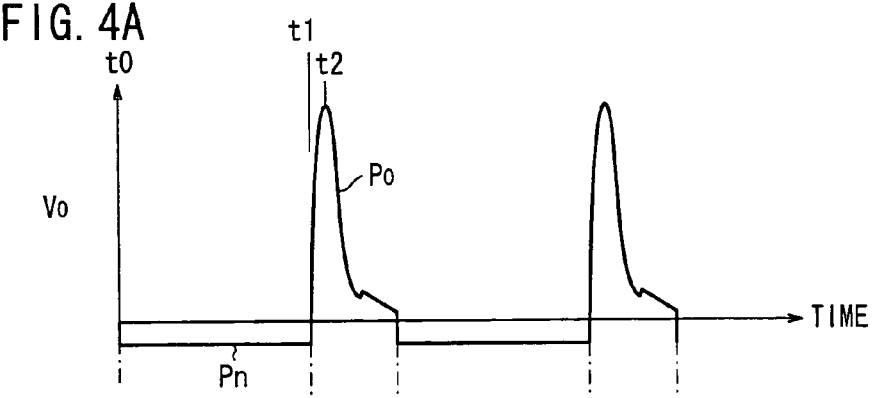
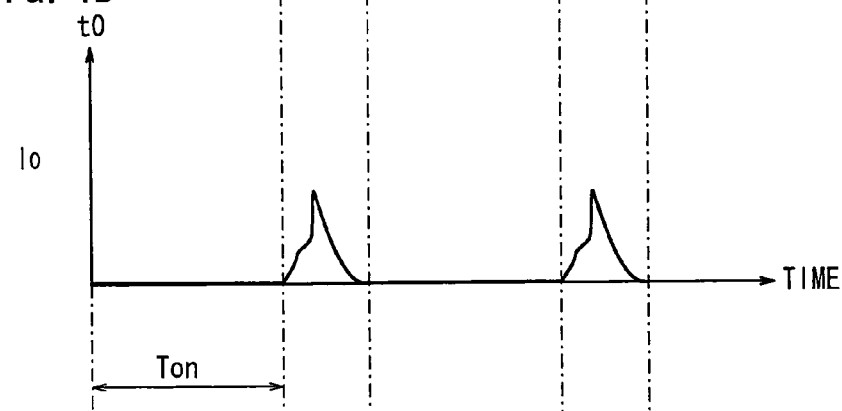
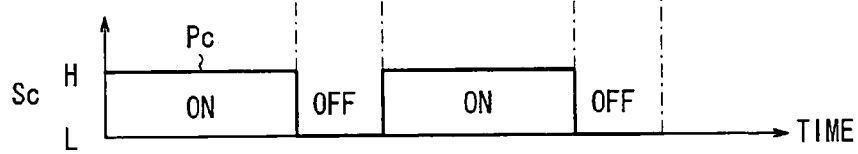

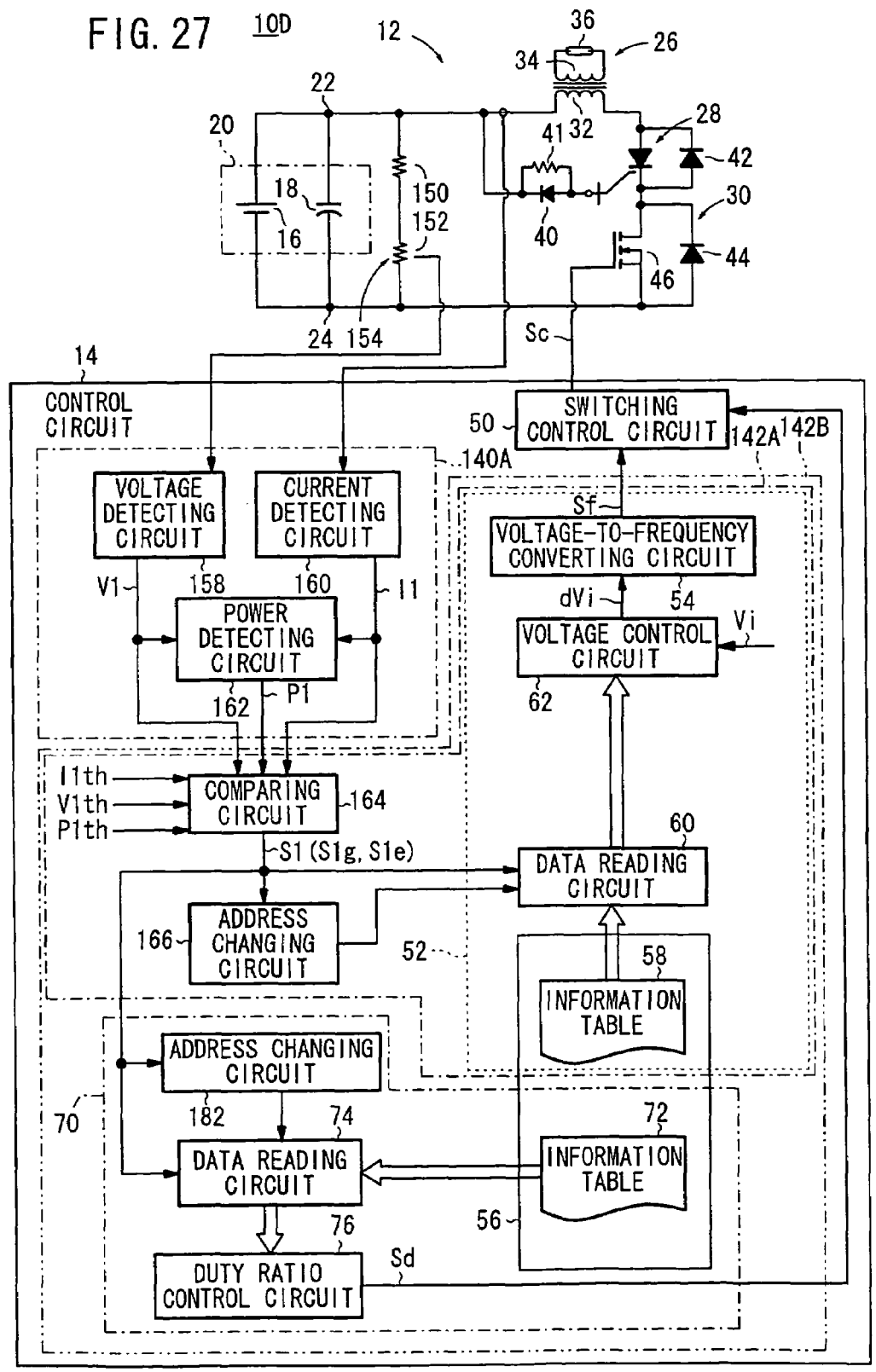

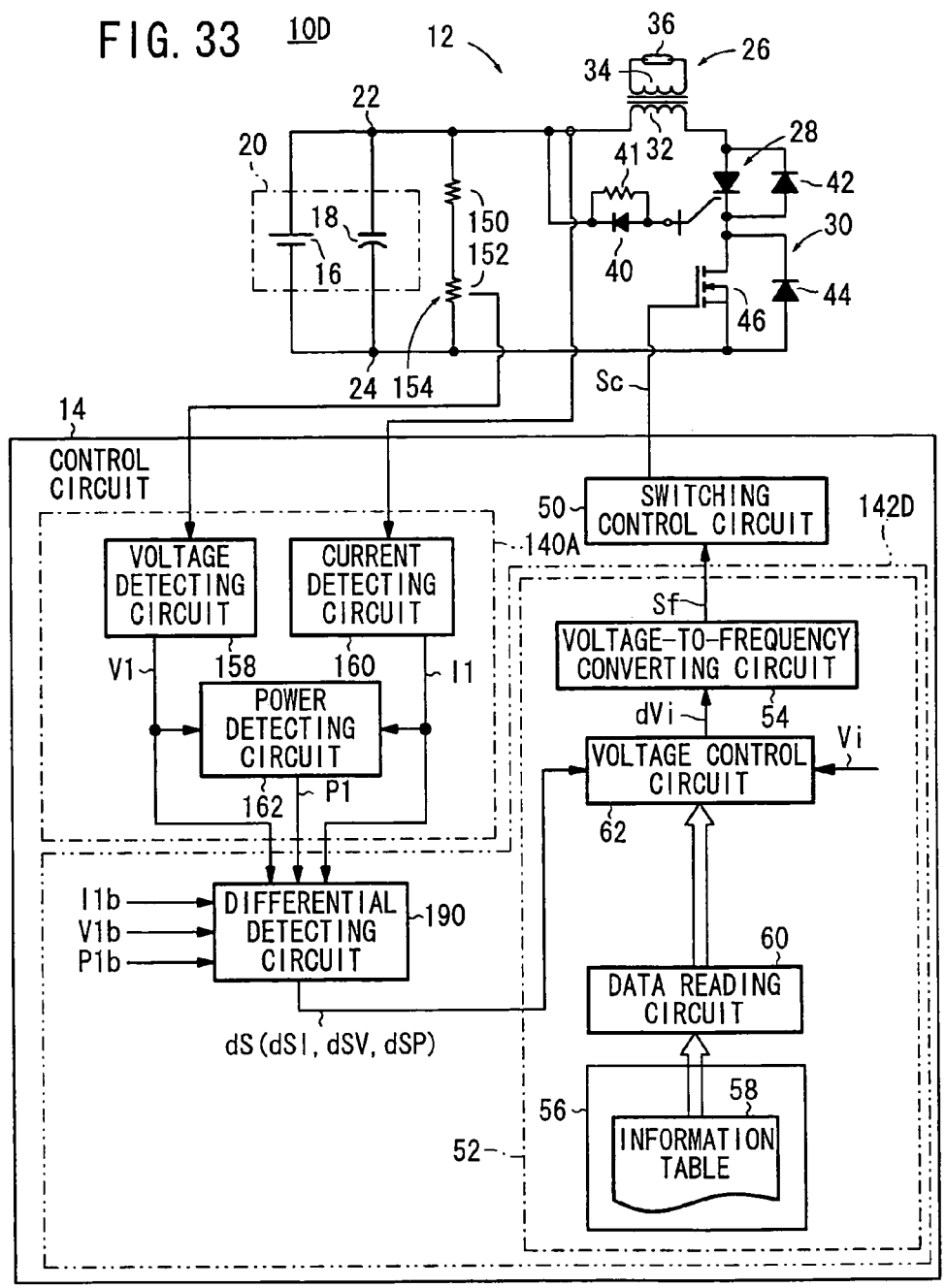

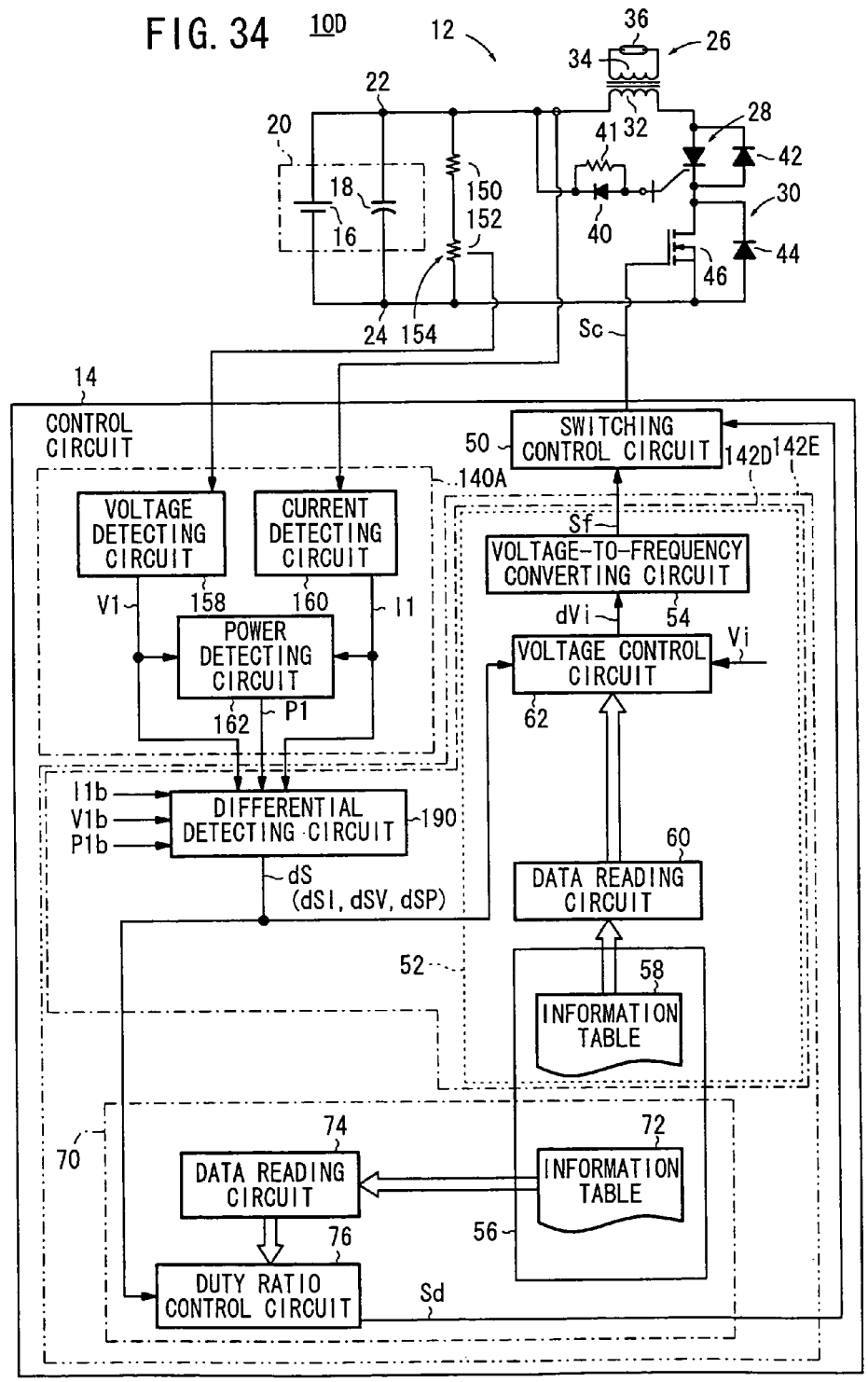

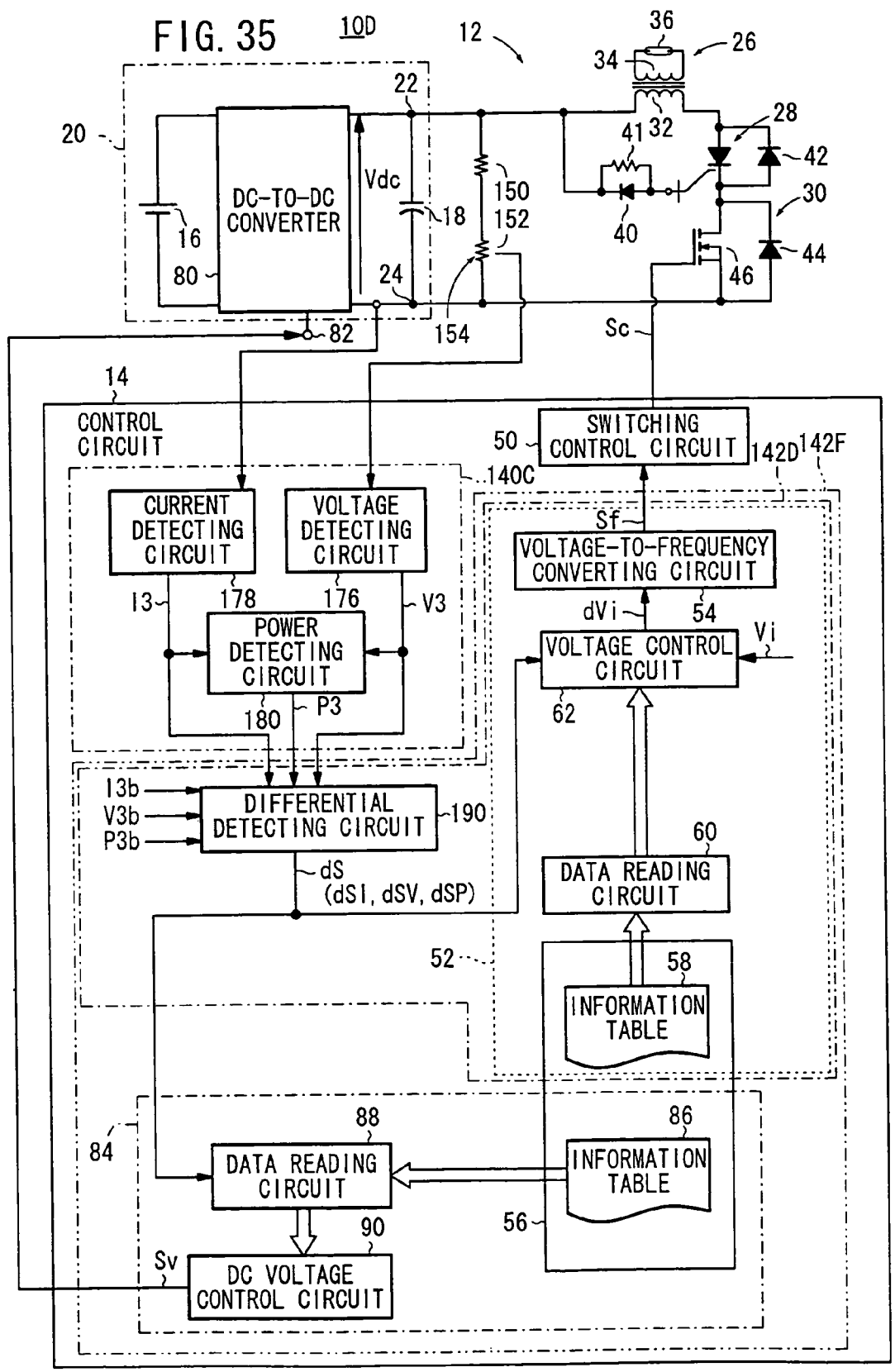

DISCHARGE LAMP ENERGIZING CIRCUIT AND METHOD OF ENERGIZING DISCHARGE LAMP

BACKGROUND OF THE INVENTION

1. Field of the Invention

The present invention relates to a discharge lamp energizing circuit for energizing a discharge lamp, e.g., an HID (High Intensity Discharge) lamp such as a high-pressure sodium lamp, a metal halide lamp, a mercury lamp, or the like, and a method of energizing a discharge lamp.

2. Description of the Related Art

Generally, HID lamps offer the following advantages:

(1) Since each HID lamp emits a large flux of light, it is suitable for illuminating a large space.

(2) Since HID lamps have a better light emission efficiency than incandescent lamps and halogen lamps, the HID lamps serve an energy saver in facilities which adopt them.

(3) Since HID lamps have a long service life, their running costs and maintenance costs are low.

One known circuit for energizing a discharge lamp such as an HID lamp or the like is an energizing circuit 1 shown in FIG. 36 of the accompanying drawings, as disclosed in Japanese Laid-Open Patent Publication No. 2003-272887, for example.

As shown in FIG. 36, the energizing circuit 1 comprises a DC power supply 2, a DC-to-DC converter 3, a DC-to-AC converter 4, a starter 5, a discharge lamp 6, a controller 7, and a detector 8.

The DC-to-DC converter 3 converts a DC voltage applied from the DC power supply 2 into a desired DC voltage. The DC-to-DC converter 3 comprises a voltage-resonant flyback DC-to-DC converter.

The DC-to-AC converter 4 converts the DC voltage output from the DC-to-DC converter 3 into an AC voltage, and supplies the AC voltage through the starter 5 to the discharge lamp 6. For example, the DC-to-AC converter 4 comprises a bridge of four semiconductor switching devices and a driver for the bridge. Two pairs of the semiconductor switching devices are complementarily turned on and off to produce an AC voltage.

The starter 5 generates a high-voltage pulse signal for starting the discharge lamp 6, i.e., a starting pulse, and applies the high-voltage pulse signal to start energizing the discharge lamp 6. The high-voltage pulse signal is added to the AC voltage output from the DC-to-AC converter 4, and then applied to the discharge lamp 6.

The controller 7 is supplied with a detected signal representative of the actual voltage applied to the discharge lamp 6 and the actual current flowing to the discharge lamp 6 or a voltage which corresponds to the actual voltage and a current which corresponds to the actual current. In response to the detected signal, the controller 7 controls electric power charged into the discharge lamp 6 and also controls the DC voltage output from the DC-to-DC converter 3.

Recently, HID lamps have been finding use as light sources for automotive headlights. Therefore, there is a growing demand for small-size energizing circuits for discharge lamps.

The conventional circuit for energizing a discharge lamp as disclosed in Japanese Laid-Open Patent Publication No. 2003-272887 poses limitations on efforts to reduce its size because it requires the starter 5 in addition to the DC-to-AC converter 4.

Furthermore, since the HID lamp needs to be kept at a high temperature for its operation, it takes about 4 to 8 minutes until the brightness becomes stable after the power supply switch thereof has been turned on. When the HID lamp is turned on immediately after it has been de-energized, it takes about 5 to 15 minutes until it starts emitting light. Particularly, an HID lamp placed in an automotive electric accessory such as a headlight tends to have a long restarting time.

Accordingly, it is difficult for HID lamps to find widespread use as light sources for automotive headlights unless they are smaller in size and can be restarted in shorter time.

SUMMARY OF THE INVENTION

It is an object of the present invention to provide a discharge lamp energizing circuit for energizing a discharge lamp, e.g., an HID or the like, which is small in size, is capable of starting and restarting the HID lamp in a reduced period of time, and is effective to promote the widespread use of HID lamps as light sources for automotive headlights, and a method of energizing a discharge lamp, e.g., an HID lamp or the like.

According to the present invention, there is provided a circuit for outputting a succession of positive and negative pulses to energize a discharge lamp, i.e., a discharge lamp energizing circuit, comprising a pulse generating circuit having a DC power supply unit, and a transformer and at least one semiconductor switch which are connected in series across the DC power supply unit, wherein the pulse generating circuit outputs high-voltage pulses to the discharge lamp, and a control circuit for supplying energizing pulses for turning on and off the semiconductor switch, wherein the transformer has a secondary winding with the discharge lamp connected thereacross, the control circuit controls the energizing pulses to output the high-voltage pulses at a first frequency to cause the discharge lamp to develop an initial discharge therein during a first period, and controls the energizing pulses to output the high-voltage pulses at a second frequency which is higher than the first frequency to develop a substantially steady discharge in the discharge lamp during a second period subsequent to the first period. The initial discharge referred to above includes a discharge caused when the discharge lamp is energized first and a discharge caused when the discharged lamp is restarted after the discharged lamp is de-energized.

According to the present invention, the discharge lamp energizing circuit is relatively small in size because it combines the DC-to-AC converter 4 and the starter 5 disclosed in Japanese Laid-Open Patent Publication No. 2003-272887, for example, into a single circuit.

During the first period, an arc discharge occurs in the discharge lamp due to the high-voltage pulses at the first frequency, and the impedance in the discharge lamp is lowered as a metal vapor fills the discharge lamp. During the following second period, the arc discharge is sustained at the second frequency and a certain amount of electric power is supplied to the discharge lamp to keep a stable discharge in the discharge lamp. By thus controlling the electric power, the period of time required until the stable discharge in the discharge lamp is reached is shortened, making it possible to reduce the starting time and the restarting time of the discharge lamp.

According to the present invention, as described above, the discharge lamp energizing circuit which is suitable for high-luminance discharge lamps such as HID lamps or the like is reduced in size, and allows the starting time and the restarting time of the discharge lamp to be shortened. The discharge lamp energizing circuit makes it possible for the discharge lamp to find widespread use as light sources for automotive headlights.

The control circuit may comprise a detecting circuit for detecting a current value flowing in the pulse generating circuit and/or a voltage value generated by the pulse generating circuit during an initial stage of the second period, and a discharge control circuit for controlling the discharge lamp to develop the substantially steady discharge therein during the second period, based on the value detected by the detecting circuit.

The discharge control circuit may have a frequency setting circuit for setting the second frequency as an output frequency for the energizing pulses. The frequency setting circuit may set the output frequency for the energizing pulses so that the frequency of the high-voltage pulses is set to a frequency lower than the second frequency if the current value detected by the detecting circuit is equal to or lower than a predetermined threshold value, if the voltage value detected by the detecting circuit is equal to or lower than a predetermined threshold value, or if a power value based on the current value and the voltage value detected by the detecting circuit is equal to or lower than a predetermined threshold value, and may subsequently set the output frequency for the energizing pulses so that the frequency lower than the second frequency changes to the second frequency.

The discharge control circuit may have a frequency setting circuit for setting an output frequency for the energizing pulses. The frequency setting circuit may control the output frequency for the energizing pulses so that the current value detected by the detecting circuit becomes a prescribed current value, or the voltage value detected by the detecting circuit becomes a prescribed voltage value, or a power value based on the current value and the voltage value detected by the detecting circuit becomes a prescribed power value.

The discharge control circuit may have a duty ratio setting circuit for setting the duty ratio of the energizing pulses, which represents the ratio of turned-on and turned-off periods of the semiconductor switch, to a predetermined duty ratio. The duty ratio setting circuit may set the duty ratio of the energizing pulses to a duty ratio representing a longer turned-on period than the predetermined duty ratio if the current value detected by the detecting circuit is equal to or smaller than a predetermined threshold value, or if the voltage value detected by the detecting circuit is equal to or smaller than a predetermined threshold value, or if a power value based on the current value and the voltage value detected by the detecting circuit is equal to or smaller than a predetermined threshold value, and may subsequently change the duty ratio representing the longer turned-on period than the predetermined duty ratio to the predetermined duty ratio.

The discharge control circuit may have a voltage setting circuit for setting the DC voltage of the DC power supply unit to a predetermined DC voltage. If the current value detected by the detecting circuit is different from a prescribed current value, then the voltage setting circuit may control the DC voltage so that the current value becomes the prescribed current value, or if the voltage value detected by the detecting circuit is different from a prescribed voltage value, then the voltage setting circuit may control the DC voltage so that the voltage value becomes the prescribed voltage value, or if a power value based on the voltage value and the current value detected by the detecting circuit is different from a prescribed power value, then the voltage setting circuit may control the DC voltage so that the power value becomes the prescribed power value.

The pulse generating circuit may comprise the transformer, a first semiconductor switch and a second semiconductor switch which are connected in series across the DC power supply unit. The transformer may include a primary winding having a terminal connected to an anode of the first semiconductor switch and another terminal connected to a gate of the first semiconductor switch through a diode. The diode may have a cathode connected to the other terminal of the primary winding and an anode connected to the gate of the first semiconductor switch. The control circuit may supply the energizing pulses for turning on and off the second semiconductor switch.

With the above arrangement, an induced energy is stored in the transformer when the second semiconductor switch is turned on thereby to render the first semiconductor switch conductive, and a discharge is developed in the discharge lamp when the second semiconductor switch is turned off thereby to turn off the first semiconductor switch. According to the present invention, a specific circuit arrangement can be provided for combining the DC-to-AC converter 4 and the starter 5 disclosed in Japanese Laid-Open Patent Publication No. 2003-272887, for example, into a single circuit.

The transformer may have a primary winding with a tap connection terminal thereon. The pulse generating circuit may have a first semiconductor switch connected between a negative terminal of a DC power supply and the tap connection terminal for drawing a current flowing through the primary winding into the DC power supply, a second semiconductor switch connected between a terminal of the primary winding and a positive terminal of the DC power supply, and a third semiconductor switch connected between another terminal of the primary winding and the positive terminal of the DC power supply, wherein the control circuit supplies the energizing pulses for turning on and off the second semiconductor switch and the third semiconductor switch.

Alternatively, the pulse generating circuit may have a diode forward-connected between a positive terminal of the DC power supply and the tap connection terminal, a first semiconductor switch connected between a terminal of the primary winding and a negative terminal of the DC power supply for allowing a current from the DC power supply to flow from the tap connection terminal to the terminal of the primary winding, a second semiconductor switch for turning on and off the first semiconductor switch, a third semiconductor switch connected between another terminal of the primary winding and the negative terminal of the DC power supply for allowing a current from the DC power supply to flow from the tap connection terminal to the other terminal of the primary winding, and a fourth semiconductor switch for turning on and off the third semiconductor switch, the control circuit supplies the energizing pulses for turning on and off the second semiconductor switch and the fourth semiconductor switch.

In these pulse generating circuits, since the high-voltage pulses are successively output in both positive and negative directions, the period of time required until a high-voltage pulse waveform necessary to cause an arc discharge is formed is reduced, thereby shortening the starting time and the restarting time of the discharge lamp. Furthermore, as the DC-to-AC converter 4 disclosed in Japanese Laid-Open Patent Publication No. 2003-272887, for example, can be dispensed with, the discharge lamp energizing circuit can be reduced in size and cost.

According to the present invention, there is also provide a method of energizing a discharging lamp with a discharge lamp energizing circuit having a pulse generating circuit having a DC power supply unit, and a transformer and at least one semiconductor switch which are connected in series across the DC power supply unit, wherein the pulse generating circuit outputs high-voltage pulses to the discharge lamp, and a control circuit for supplying energizing pulses for turning on and off the semiconductor switch, wherein the transformer has a secondary winding with the discharge lamp connected thereacross, the method comprising the steps of (a) outputting the high-voltage pulses at a first frequency to cause the discharge lamp to develop an initial discharge therein during a first period, and (b) outputting the high-voltage pulses at a second frequency which is higher than the first frequency to develop a substantially steady discharge in the discharge lamp during a second period subsequent to the first period.

With the above method, the discharge lamp energizing circuit which is suitable for high-luminance discharge lamps such as HID lamps or the like is reduced in size, and allows the starting time and the restarting time of the discharge lamp to be shortened. The discharge lamp energizing circuit makes it possible for the discharge lamp to find widespread use as light sources for automotive headlights.

In the above method, the step (b) may comprise the steps of detecting a current value flowing in the pulse generating circuit and/or a voltage value generated by the pulse generating circuit during an initial stage of the second period, and controlling the discharge lamp to develop the substantially steady discharge therein during the second period, based on the detected value.

With the circuit for and the method of energizing the discharge lamp according to the present invention, the discharge lamp energizing circuit for energizing high-luminance discharge lamps such as HID lamps or the like is reduced in size, and the starting time and the restarting time of the discharge lamp are shortened. The discharge lamp energizing circuit makes it possible for the discharge lamp such as high-luminance discharge lamps to find widespread use as light sources for automotive headlights.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a circuit diagram, partly in block form, of a discharge lamp energizing circuit according to a first embodiment of the present invention;

FIG. 4A is a diagram showing the waveform of high-voltage pulses which are supplied to a discharge lamp by switching pulses having a first frequency;

FIG. 4B is a diagram showing the waveform of a current which is supplied to the discharge lamp by the switching pulses having the first frequency;

FIG. 4C is a diagram showing the waveform of a switching control signal;

FIG. 27 is a circuit diagram, partly in block form, of the discharge lamp energizing circuit according to the fourth embodiment, particularly the first detecting circuit and a second discharge control circuit thereof;

FIG. 33 is a circuit diagram, partly in block form, of the discharge lamp energizing circuit according to the fourth embodiment, particularly the first detecting circuit and a fourth discharge control circuit thereof;

FIG. 34 is a circuit diagram, partly in block form, of the discharge lamp energizing circuit according to the fourth embodiment, particularly the first detecting circuit and a fifth discharge control circuit thereof;

FIG. 35 is a circuit diagram, partly in block form, of the discharge lamp energizing circuit according to the fourth embodiment, particularly the third detecting circuit and a sixth discharge control circuit thereof.

DESCRIPTION OF THE PREFERRED EMBODIMENTS

Figure 2A:
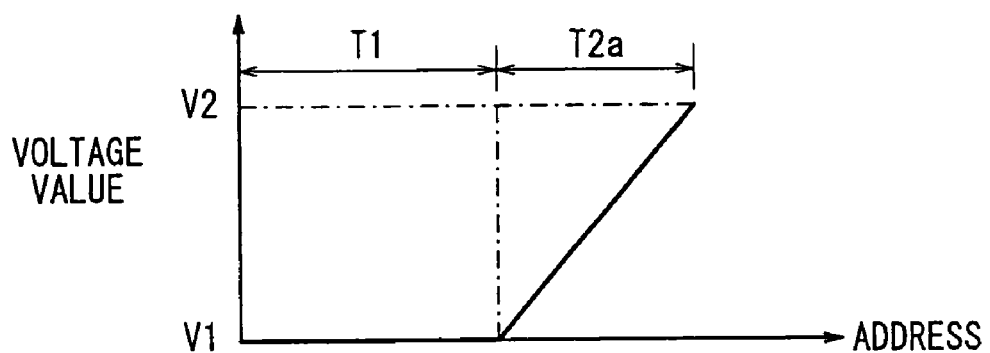
FIG. 2A is a diagram showing a first data characteristic curve of a data string stored in a frequency information table.

Like or corresponding parts are denoted by like or corresponding reference characters throughout views.

Preferred embodiments of the present invention in which a discharge lamp energizing circuit and a method of energizing a discharge lamp are applied to a discharge lamp energizing circuit for energizing an HID lamp, for example, will be described below with reference to FIGS. 1 through 35.

As shown in FIG. 1, a discharge lamp energizing circuit 10A according to a first embodiment of the present invention (hereinafter referred to as "first discharge lamp energizing circuit 10A") generally has a pulse generating circuit 12 and a control circuit 14.

The pulse generating circuit 12 comprises a DC power supply unit 20 having a DC power supply 16 for producing a power supply voltage Vdc and a capacitor 18 for lowering a high-frequency impedance, a transformer 26 connected in series to both positive and negative terminals 22, 24 of the DC power supply unit 20, a first semiconductor switch 28, and a second semiconductor switch 30.

The transformer 26 has a primary winding 32 and a secondary winding 34, and produces a high voltage across the secondary winding 34. A high-luminance discharge lamp 36 such as a high-pressure sodium lamp, a metal halide lamp, a mercury lamp, or the like is connected across the secondary winding 34. The primary winding 32 of the transformer 26 has a terminal 38a connected to the anode of the first semiconductor switch 28.

A diode 40 is connected between the gate of the first semiconductor switch 28 and another end 38b of the primary winding 32. The diode 40 has an anode connected to the gate of the first semiconductor switch 28 and a cathode to the other end 38b of the primary winding 32. A resistor 41 is connected in parallel to the diode 40.

A diode 42 is connected in parallel to the first semiconductor switch 28. The diode 42 has an anode and a cathode which are connected respectively to the cathode and the anode of the first semiconductor switch 28. Therefore, the diode 42 and the first semiconductor switch 28 are inversely parallel connected to each other.

In FIG. 1, the second semiconductor switch 30 is connected to the negative terminal 24 of the DC power supply unit 20 for the same effect. However, the second semiconductor switch 30 may be connected to the positive terminal 22 of the DC power supply unit 20. The output voltage of the pulse generating circuit 12 may be produced across the first semiconductor switch 28, rather than the transformer 26.

The second semiconductor switch 30 may comprise a self-extinguished or commutation-extinguished device. In the illustrated embodiment, the second semiconductor switch 30 comprises a power metal oxide semiconductor field effect transistor 46 combined with an inversely parallel connected avalanche diode 44. The second semiconductor switch 30 is supplied with a switching control signal Sc from a switching control circuit 50 that is included in the control circuit 14. The switching control signal Sc is applied between the gate and source of the second semiconductor switch 30.

As shown in FIG. 4C, the switching control signal Sc includes a plurality of switching pulses Pc for turning on and off the second semiconductor switch 30. The second semiconductor switch 30 is turned on during the pulse durations of the switching pulses Pc, i.e., while the switching control signal Sc is high in level.

The first semiconductor switch 28 may comprise a current-controlled device or a self-extinguished or commutation-extinguished device. In the illustrated embodiment, the first semiconductor switch 28 comprises an SI thyristor having a very high resistance to a voltage rise rate (dv/dt) at the time it is turned off, and also having a high voltage rating.

The pulse generating circuit 12 outputs high-voltage pulses Po in one direction, e.g., in a positive direction, as described later on. The high-voltage pulses Po are output from the pulse generating circuit 12 at the same frequency as the switching pulses Pc.

The control circuit 14 has a frequency setting circuit 52 in addition to the switching control circuit 50. The frequency setting circuit 52 comprises a voltage-to-frequency converting circuit 54 for converting an input voltage, i.e., a control voltage dVi, into a frequency signal Sf, a frequency information table 58 recorded in a memory 56, for example, and storing data representative of changes in an input voltage Vi per unit time, a data reading circuit 60 for successively reading the stored data from the frequency information table 58, and a voltage control circuit 62 for modulating the input voltage Vi based on the data read from the frequency information table 58 and outputting the modulated voltage Vi as the control voltage dVi.

The switching control circuit 50 synchronizes the switching pulses Pc with the frequency of the frequency signal Sf from the voltage-to-frequency converting circuit 54, and outputs the synchronized switching pulses Pc as the control signal Sc.

Figure 3A:
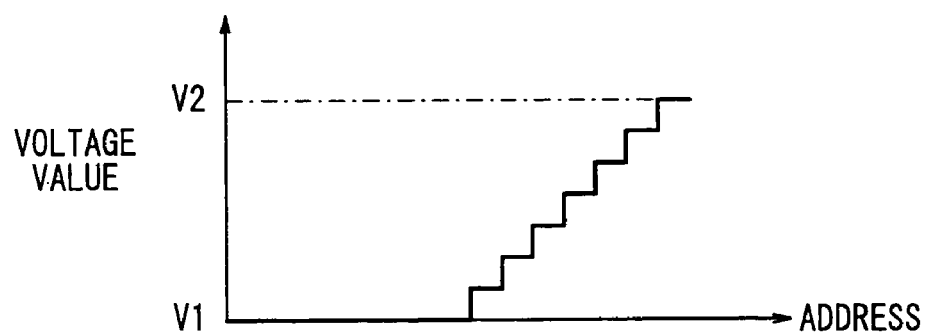
FIG. 3A is a diagram showing a second data characteristic curve of a data string stored in the frequency information table.

The data representative of changes in the input voltage Vi, which are stored in the frequency information table 58, include a first data characteristic curve shown in FIG. 2A and a second data characteristic curve shown in FIG. 3A, for example.

As shown in FIG. 2A, the first data characteristic curve represents a constant voltage level V1, i.e., a voltage level corresponding to a first frequency f1, at addresses corresponding to a first period T1, and a varying voltage level at addresses corresponding to an initial stage T2a of a second period T2, which increases at a constant rate per unit time from the constant voltage level V1 to a maximum voltage level V2, i.e., a voltage level corresponding to a second frequency f2.

As shown in FIG. 3A, the second data characteristic curve represents the constant voltage level V1, i.e., the voltage level corresponding to the first frequency f1, at the addresses corresponding to the first period T1, and a varying voltage level at the addresses corresponding to the initial stage T2a of the second period T2, which increases stepwise regularly or irregularly from the constant voltage level V1 to the maximum voltage level V2, i.e., the voltage level corresponding to the second frequency f2.

When the data reading circuit 60 reads the maximum voltage level V2 from the frequency information table 58, the data reading circuit 60 subsequently reads only the maximum voltage level V2 and supplies the maximum voltage level V2 to the voltage control circuit 62.

The switching pulses Pc contained in the switching control signal Sc that is output from the switching control circuit 50 have a frequency based on the first data characteristic curve shown in FIG. 2A or the second data characteristic curve shown in FIG. 3A.

Figure 2B:
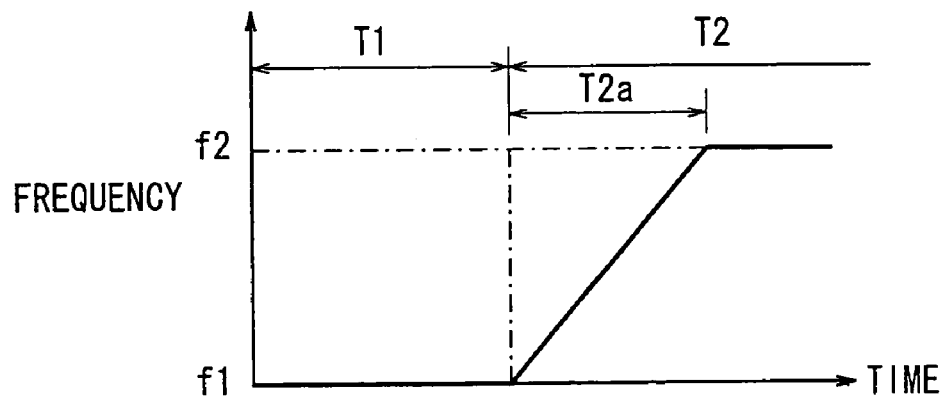
FIG. 2B is a diagram showing how the frequency of switching pulses is changed by a frequency setting circuit based on the first data characteristic curve.

Specifically, if the first data characteristic curve shown in FIG. 2A is employed, then, as shown in FIG. 2B, the switching pulses Pc are output at the first frequency f1 in the first period T1. In the initial stage T2a of the second period T2, the frequency of the switching pulses Pc increases at a constant rate per unit time from the first frequency f1 to the second frequency f2. When the frequency of the switching pulses Pc reaches the second frequency f2, the switching pulses Pc keep the second frequency f2.

Figure 3B:
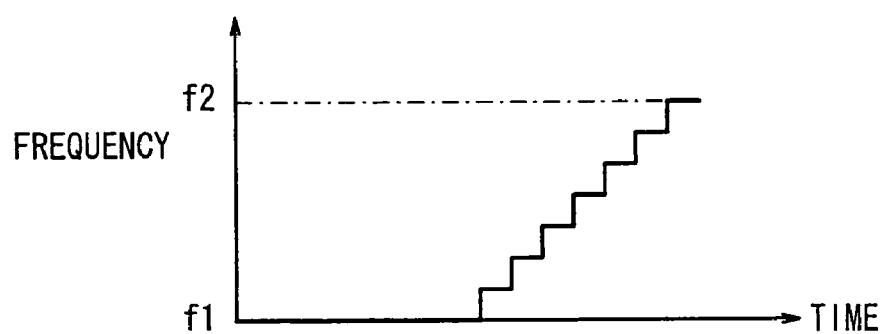
FIG. 3B is a diagram showing how the frequency of switching pulses is changed by the frequency setting circuit based on the second data characteristic curve.

If the second data characteristic curve shown in FIG. 3A is employed, then, as shown in FIG. 3B, the switching pulses Pc are output at the first frequency f1 in the first period T1. In the initial stage T2a of the second period T2, the frequency of the switching pulses Pc increases stepwise regularly or irregularly from the first frequency f1 to the second frequency f2. When the frequency of the switching pulses Pc reaches the second frequency f2, the switching pulses Pc keep the second frequency f2.

Figure 5A:
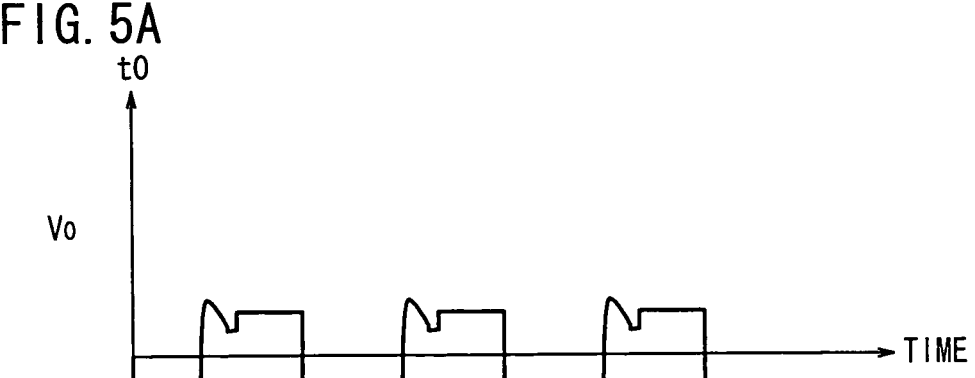
FIG. 5A is a diagram showing the waveform of high-voltage pulses which are supplied to the discharge lamp by switching pulses having a second frequency.
Figure 5B:
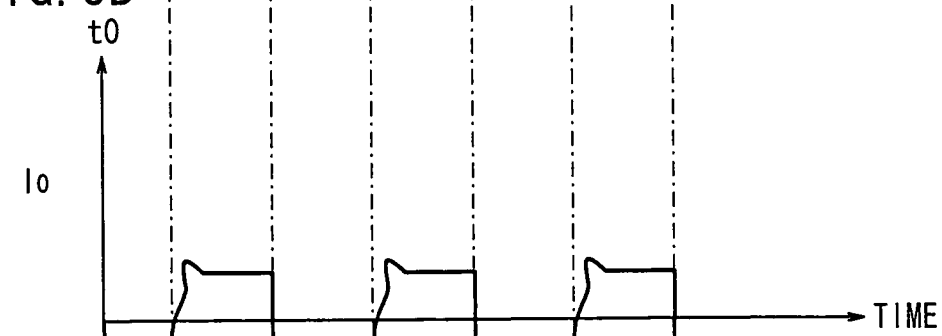
FIG. 5B is a diagram showing the waveform of a current which is supplied to the discharge lamp.
Figure 5C:
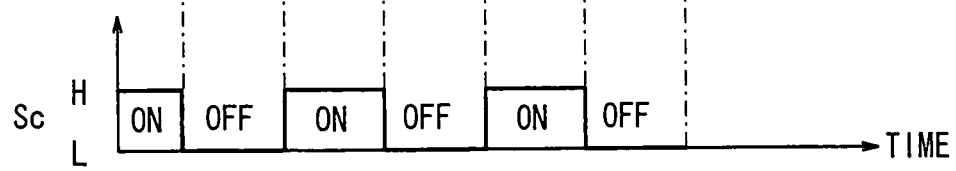
FIG. 5C is a diagram showing the waveform of a switching control signal.

Operation of the pulse generating circuit 12 of the first discharge lamp energizing circuit 10A will be described below with reference to FIGS. 1, 4A through 5C. FIGS. 4A and 5A show the waveforms of respective output voltages Vo across the secondary winding 34 of the transformer 26. FIGS. 4B and 5B show the waveforms of respective currents Io flowing through the secondary winding 34. FIGS. 4C and 5C show the waveforms of respective switching control signals Sc.

In the first discharge lamp energizing circuit 10A, during the first period T1, the switching pulses Pc of the first frequency f1 are supplied to the second semiconductor switch 30. The high-voltage pulses Po are now applied at the first frequency f1 to the discharge lamp 36, which causes an arc discharge to lower the impedance therein. Thereafter, after the initial stage T2a in the second period T2, the switching pulses Pc of the second frequency f2 are supplied to the second semiconductor switch 30. The high-voltage pulses Po are applied at the second frequency f2 to the discharge lamp 36, which causes an arc discharge to emit light therefrom.

First, operation of the pulse generating circuit 12 when the frequency of the switching pulses Pc is the first frequency f1 (in the range from 10 kHz to 100 kHz) will be described below with reference to FIGS. 4A through 4C.

At time t0, a high-level switching pulse Pc of the switching control signal Sc is supplied between the gate and source of the second semiconductor switch 30, tuning on the second semiconductor switch 30.

At this time, the first semiconductor switch 28 is turned on by an electric field applied between the gate and cathode thereof through the resistor 41 that is connected in parallel to the diode 40. Since the anode current of the first semiconductor switch 28 is prevented from rising by the transformer 26, the first semiconductor switch 28 is properly turned on only by the applied electric field.

When the first semiconductor switch 28 and the second semiconductor switch 30 are rendered conductive at time t0, a voltage which is substantially the same as the power supply voltage Vdc of the DC power supply unit 20 is applied to the transformer 26, and a current flowing through the primary winding 32 thereof increases linearly at a constant gradient with time.

During a period Ton in which the first semiconductor switch 28 is turned on, a constant negative voltage, i.e., a negative pulse Pn, is output across the secondary winding 34 (see FIG. 4A). The negative pulse Pn has a level of –85 V, for example. Since the impedance of the discharge lamp 36 is extremely high during the period Ton, almost no current Io flows through the secondary winding 34, keeping 0 A during the period Ton (see FIG. 4B).

Thereafter, at time t1, the switching pulse Pc supplied between the gate and source of the second semiconductor switch 30 goes low in level (see FIG. 4C), turning off the second semiconductor switch 30. As the current from the cathode of the first semiconductor switch 28 becomes zero, i.e., as the first semiconductor switch 28 is opened, the current flowing through the primary winding 32 is cut off. The primary winding 32 tends to generate an inversely induced voltage due to the remaining electromagnetic energy. Because of the diode 40, the current from the primary winding 32 flows into a path extending from the anode of the first semiconductor switch 28 through the gate of the first semiconductor switch 28 and the anode of the diode 40 to the cathode of the diode 40.

When the carriers in the first semiconductor switch 28 are eliminated due to the flow of the current from the primary winding 32, the first semiconductor switch 28 is quickly turned off. At this time, a high-voltage pulse Po starts being applied to the discharge lamp 36, and the level of the high-voltage pulse Po sharply rises under the induced electromotive force generated by the transformer 26. At time t2 when the first semiconductor switch 28 is turned off and the current flowing through the primary winding 32 becomes nil, the high-voltage pulse Po has a peak level (see FIG. 4A), and the current Io flowing through the secondary winding 34 also has a peak level with a slight delay (see FIG. 4B).

The peak level of the high-voltage pulse Po is expressed by nL1(di/dt) where n represents the turn ratio of the transformer 26, L the primary inductance of the transformer 26, and (di/dt) the cutoff rate of the current flowing through the primary winding 32 of the transformer. For example, the peak level of the high-voltage pulse Po is in the range from 18 to 20 kV. If the anode-to-cathode voltage of the first semiconductor switch 28 is represented by $V_{AK}$, then the peak level of the high-voltage pulse Po is expressed by $nV_{AK}$ and is higher than the anode-to-cathode voltage $V_{AK}$ of the first semiconductor switch 28. If the equivalent electric capacitance of the first semiconductor switch 28 is represented by C, then the pulse duration Tp of high-voltage pulse Po is expressed by:

$$Tp \approx \pi\sqrt{LC}$$

When the discharge lamp 36 is supplied with the high-voltage pulses Po having the first frequency f1, the discharge lamp 36 develops an arc discharge, producing a metal vapor therein and lowering its impedance.

Operation of the pulse generating circuit 12 when the frequency of the switching pulses Pc is the second frequency f2 (higher than 100 kHz) will be described below with reference to FIGS. 5A through 5C.

As shown in FIG. 2B or 3B, during the initial stage T2a of the second period T2, the frequency of the switching pulses Pc of the switching control signal Sc increases linearly or stepwise from the first frequency f1 to the second frequency f2. During the initial stage T2a, the pulse generating circuit 12 operates in the same manner as described above from time t0 to time t2. When the frequency of the switching pulses Pc reaches the second frequency f2, as shown in FIG. 5C, the switching pulses Pc are high in shorter periods, i.e., the second semiconductor switch 30 is turned on in shorter periods, and hence the first semiconductor switch 28 is turned on also in shorter periods. Therefore, the amount of electromagnetic energy that is stored in the transformer 26 while the first semiconductor switch 28 is being turned on is smaller than when the frequency of the switching pulses Pc is the first frequency f1. The peak level of the high-voltage pulse Po and the peak level of the current Io flowing through the secondary winding 34 at the time the first semiconductor switch 28 is turned off are also lower.

If the impedance of the discharge lamp 36 is represented by R, then the voltage that is applied to the discharge lamp 36 when the current is cut off is expressed by Io×R. If the time in which the second semiconductor switch 30 is turned on and the time in which the second semiconductor switch 30 is turned off are the same as each other, i.e., if the duty ratio of the switching pulses Pc, is 50%, and circuit constants are selected to apply the voltage Io×R to the discharge lamp 36, then the pulse generating circuit 12 can output identical positive and negative voltages to be applied to the discharge lamp 36. Stated otherwise, the pulse generating circuit 12 may be arranged such that the product of the current Io and the impedance R of the discharge lamp 36 is the same as the product of the voltage increasing ratio n of the transformer 26 and the DC voltage. With this arrangement, wear on the electrodes within the discharge lamp 36 is reduced for thereby increasing the service life of the discharge lamp 36.

The control circuit 14 stops supplying the switching control signal Sc to the second semiconductor switch 30 to stop light emission from the discharge lamp 36, and thereafter resumes supplying the switching control signal Sc to the second semiconductor switch 30. In such a case, as described above, high-voltage pulses Po are initially generated based on the switching pulses Pc having the first frequency f1 to cause the discharge lamp 36 to develop an arc discharge therein, thereby lowering the impedance in the discharge lamp 36 due to a metal vapor generated therein. Thereafter, the electric power supplied to the discharge lamp 36 is controlled by the switching pulses Pc having the second frequency f2 to sustain the arc discharge in the discharge lamp 36 for thereby enabling the discharge lamp 36 to emit light when it is restarted.

The first discharge lamp energizing circuit 10A is relatively small in size because it combines the DC-to-AC converter 4 and the starter 5 disclosed in Japanese Laid-Open Patent Publication No. 2003-272887, for example, into a single circuit, i.e., the pulse generating circuit 12.

Particularly, during the first period T1, an arc discharge is developed in the discharge lamp 36 by the high-voltage pulses Po having the first frequency f1 to lower the impedance in the discharge lamp 36 due to a metal vapor generated therein, and during the second period T2 following the first period T1, the supplied electric power is controlled at the second frequency f2 to sustain the arc discharge stably in the discharge lamp 36. Specifically, the supplied electric power is controlled at the second frequency f2 under frequency control performed by the control circuit 14 for shortening the period of time required to achieve a stable discharge in the discharge lamp 36. The starting time and the restarting time of the discharge lamp 36 can thus be reduced.

Therefore, the first discharge lamp energizing circuit 10A which is suitable for high-luminance discharge lamps such as HID lamps or the like is reduced in size, and allows the starting time and the restarting time of the discharge lamp 36 to be shortened. The first discharge lamp energizing circuit 10A makes it possible for the discharge lamp 36 to find widespread use as light sources for automotive headlights.

In the above embodiment, the frequency of the switching pulses Pc, i.e., the frequency of the high-voltage pulses Po, is changed linearly or stepwise from the first frequency f1 to the second frequency f2. Alternatively, the frequency of the switching pulses Pc may be changed instantaneously from the first frequency f1 to the second frequency f2.

A discharge lamp energizing circuit 10B according to a second embodiment of the present invention (hereinafter referred to as "second discharge lamp energizing circuit 10B") will be described below with reference to FIGS. 6 through 9B.

The second discharge lamp energizing circuit 10B is of essentially the same structure as the first discharge lamp energizing circuit 10A, but differs therefrom in that the control circuit 14 has a duty ratio setting circuit 70 in addition to the frequency setting circuit 52. A duty ratio referred to herein means the ratio of a period in which a switching pulse Pc is of a high level, i.e., a period in which the second semiconductor switch 30 is turned on, to the entire period of the switching pulse Pc.

The duty ratio setting circuit 70 comprises a duty ratio information table 72 recorded in the memory 56, for example, and storing data representative of changes in a duty ratio per unit time, a data reading circuit 74 for successively reading the stored data from the duty ratio information table 72, and a duty ratio control circuit 76 for generating a duty ratio control signal Sd based on the data read from the duty ratio information table 72 and outputting the generated duty ratio control signal Sd.

The switching control circuit 50 controls the frequency of the switching pulses Pc based on the frequency signal Sf from the frequency setting circuit 52, and also controls the duty ratio of switching pulses Pc based on the duty ratio control signal Sd from the duty ratio setting circuit 70.

Figure 7A:
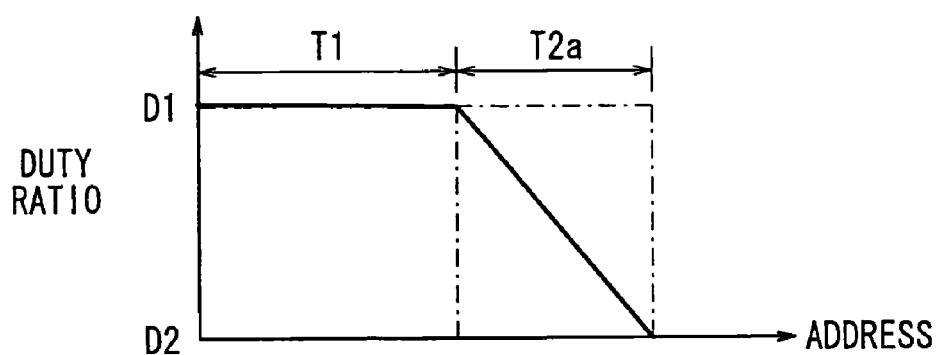
FIG. 7A is a diagram showing a first data characteristic curve of a data string stored in a duty ratio information table.
Figure 7B:
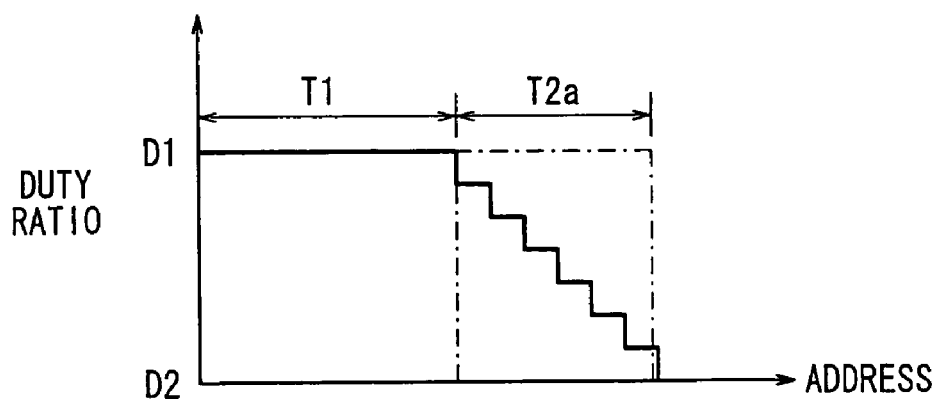
FIG. 7B is a diagram showing a second data characteristic curve of a data string stored in the duty ratio information table.

The data stored in the duty ratio information table 72 of the duty ratio setting circuit 70 include a first data characteristic curve shown in FIG. 7A and a second data characteristic curve shown in FIG. 7B, for example.

As shown in FIG. 7A, the first data characteristic curve represents data representative of a first duty ratio D1 (e.g., 80%) at addresses corresponding to a first period T1, and data representative of a varying duty ratio at addresses corresponding to an initial stage T2a of a second period T2, which decreases at a constant rate per unit time from the data representative of the first duty ratio D1 to data representative of a second duty ratio D2 (e.g., 50%).

As shown in FIG. 7B, the second data characteristic curve represents the data representative of the first duty ratio D1 (e.g., 80%) at the addresses corresponding to the first period T1, and data representative of a varying duty ratio at addresses corresponding to the initial stage T2a of the second period T2, which decreases stepwise regularly or irregularly from the data representative of the first duty ratio D1 to the data representative of the second duty ratio D2 (e.g., 50%).

When the data reading circuit 74 reads the data representative of the second duty ratio D2 from the duty ratio information table 72, the data reading circuit 74 subsequently reads only the data representative of the second duty ratio D2 and supplies the data to the duty ratio control circuit 76.

Thus, the switching pulses Pc contained in the switching control signal Sc that is output from the switching control circuit 50 have a frequency based on the first data characteristic curve shown in FIG. 2A or the second data characteristic curve shown in FIG. 3A, and a duty ratio based on the first data characteristic curve shown in FIG. 7A or the second data characteristic curve shown in FIG. 7B.

Figure 8A:
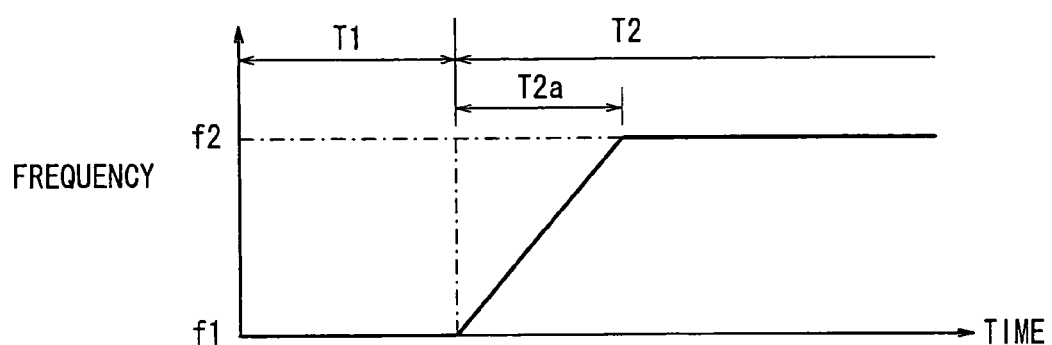
FIG. 8A is a diagram showing how the frequency of switching pulses is changed by a frequency setting circuit based on the first data characteristic curve.
Figure 8B:
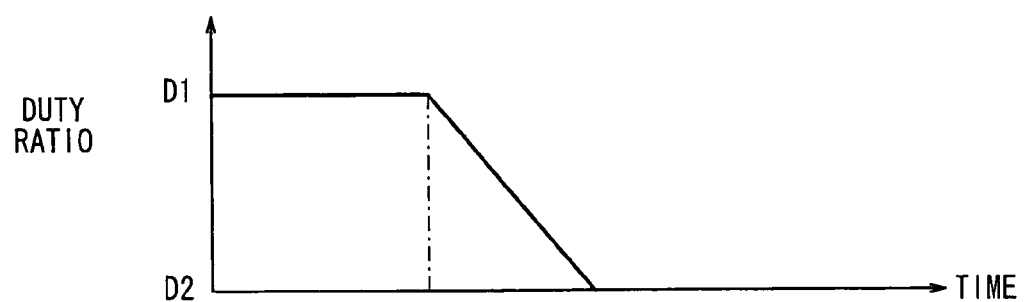
FIG. 8B is a diagram showing how the duty ratio of switching pulses is changed by a duty ratio setting circuit based on the first data characteristic curve.

For example, it is assumed that the frequency setting circuit 52 employs the first data characteristic curve shown in FIG. 2A. If the duty ratio setting circuit 70 employs the first data characteristic curve shown in FIG. 7A, then, as shown in FIGS. 8A and 8B, the switching pulses Pc are output at the first frequency f1 and the first duty ratio D1 in the first period T1. In the initial stage T2a of the second period T2, the frequency of the switching pulses Pc increases at a constant rate per unit time from the first frequency f1 to the second frequency f2, and the duty ratio of the switching pulses Pc decreases at a constant rate per unit time from the first duty ratio D1 (e.g., 80%) to the second duty ratio D2 (e.g., 50%). When the frequency of the switching pulses Pc reaches the second frequency f2 and the duty ratio of the switching pulses Pc reaches the second duty ratio D2, the switching pulses Pc keep the second frequency f2 and the second duty ratio D2.

Figure 9A:
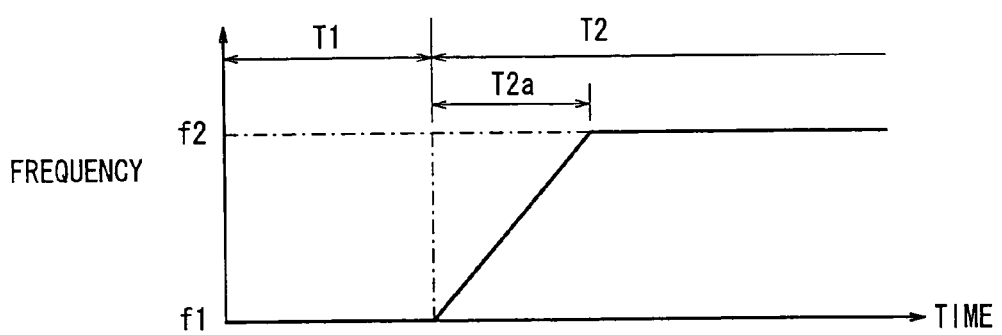
FIG. 9A is a diagram showing how the frequency of switching pulses is changed by the frequency setting circuit based on the second data characteristic curve.
Figure 9B:
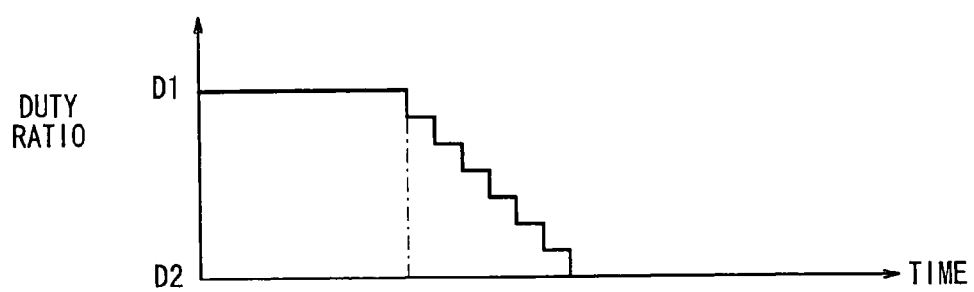
FIG. 9B is a diagram showing how the duty ratio of switching pulses is changed by the duty ratio setting circuit based on the second data characteristic curve.

If the duty ratio setting circuit 70 employs the second data characteristic curve shown in FIG. 7B, then, as shown in FIGS. 9A and 9B, the switching pulses Pc are output at the first frequency f1 and the first duty ratio D1 in the first period T1. In the initial stage T2a of the second period T2, the frequency of the switching pulses Pc increases at a constant rate per unit time from the first frequency f1 to the second frequency f2, and the duty ratio of the switching pulses Pc decreases stepwise regularly or irregularly from the first duty ratio D1 to the second duty ratio D2. When the frequency of the switching pulses Pc reaches the second frequency f2 and the duty ratio of the switching pulses Pc reaches the second duty ratio D2, the switching pulses Pc keep the second frequency f2 and the second duty ratio D2.

As with the first discharge lamp energizing circuit 10A, the second discharge lamp energizing circuit 10B is relatively small in size. The electric power supplied to the discharge lamp 36 until the impedance in the discharge lamp 36 is stabilized is controlled under frequency control and duty ratio control performed by the control circuit 14. The starting time and the restarting time of the discharge lamp 36 can thus be reduced.

In the above embodiment, the duty ratio of the switching pulses Pc is changed linearly or stepwise from the first duty ratio D1 to the second duty ratio D2. Alternatively, the duty ratio of the switching pulses Pc may be changed instantaneously from the first duty ratio D1 to the second duty ratio D2.

A discharge lamp energizing circuit 10C according to a third embodiment of the present invention (hereinafter referred to as "third discharge lamp energizing circuit 10C") will be described below with reference to FIGS. 10 through 13B.

The third discharge lamp energizing circuit 10C is of essentially the same structure as the first discharge lamp energizing circuit 10A, but differs therefrom with respect to the DC power supply unit 20 and the control circuit 14, as follows:

The DC power supply unit 20 has the DC power supply 16, the capacitor 18 for lowering the high-frequency impedance, and a DC-to-DC converter 80 connected between the DC power supply 16 and the capacitor 18. The DC-to-DC converter 80 has an output voltage (DC voltage Vdc) which changes depending on the level of a DC voltage control signal Sv that is supplied to a control terminal 82 thereof.

The control circuit 14 has a DC voltage setting circuit 84 in addition to the frequency setting circuit 52.

The DC voltage setting circuit 84 comprises a DC voltage information table 86 recorded in the memory 56, for example, and storing data representative of changes in a DC voltage per unit time, a data reading circuit 88 for successively reading the stored data from the DC voltage information table 86, and a DC voltage control circuit 90 for generating a DC voltage control signal Sv based on the data read from the DC voltage information table 86 and outputting the generated DC voltage control signal Sv.

The switching control circuit 50 controls the frequency of the switching pulses Pc based on the frequency signal Sf from the frequency setting circuit 52. The DC-to-DC converter 80 outputs a DC voltage Vdc based on the level of the DC voltage control signal Sv from the DC voltage control circuit 90.

Figure 11A:
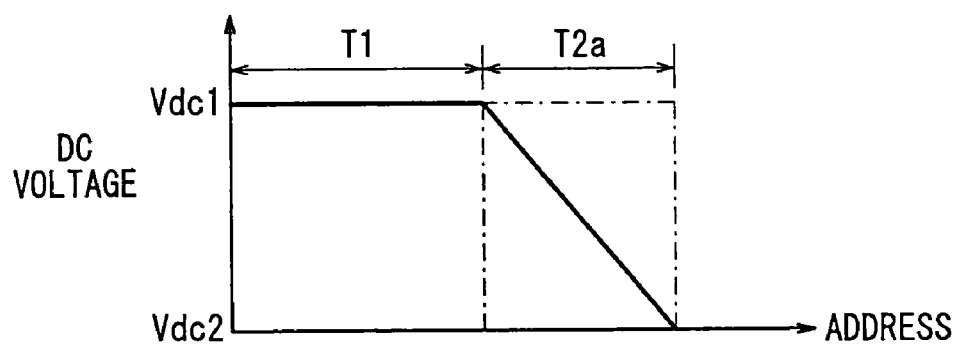
FIG. 11A is a diagram showing a first data, characteristic curve of a data string stored in a DC voltage information table.
Figure 11B:
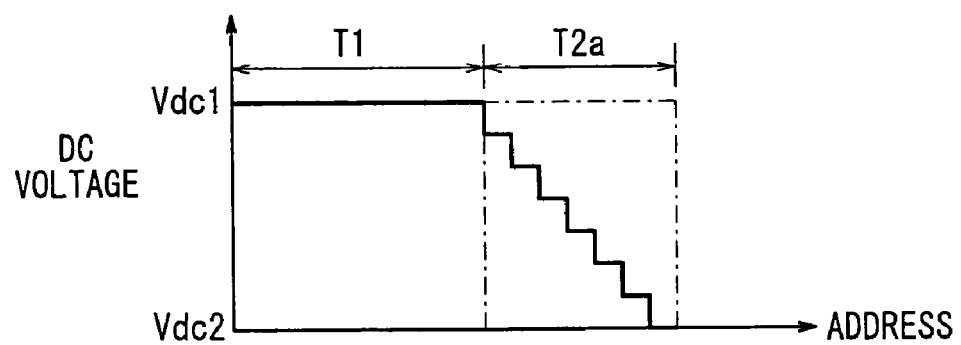
FIG. 11B is a diagram showing a second data characteristic curve of a data string stored in a DC voltage information table.

The data stored in the DC voltage information table 86 of the DC voltage setting circuit 84 include a first data characteristic curve shown in FIG. 11A and a second data characteristic curve shown in FIG. 11B, as with the above, for example.

As shown in FIG. 11A, the first data characteristic curve represents data representative of a first DC voltage Vdc1 at addresses corresponding to a first period T1, and a varying DC voltage at addresses corresponding to an initial stage T2a of a second period T2, which decreases at a constant rate per unit time from the data representative of the first DC voltage Vdc1 to data representative of a second DC voltage Vdc2.

As shown in FIG. 11B, the second data characteristic curve represents the data representative of the first DC voltage Vdc1 at the addresses corresponding to the first period T1, and data representative of a varying DC voltage at addresses corresponding to the initial stage T2a of the second period T2, which decreases stepwise regularly or irregularly from the data representative of the first DC voltage Vdc1 to the data representative of the second DC voltage Vdc2.

When the data reading circuit 88 reads the data representative of the second DC voltage Vdc2 from the DC voltage information table 86, the data reading circuit 88 subsequently reads only the data representative of the second DC voltage Vdc2 and supplies the data to the DC voltage control circuit 90.

The switching pulses Pc contained in the switching control signal Sc that is output from the switching control circuit 50 have a frequency based on the first data characteristic curve shown in FIG. 2A or the second data characteristic curve shown in FIG. 3A, and the DC-to-DC converter 80 outputs a DC voltage based on the first data characteristic curve shown in FIG. 11A or the second data characteristic curve shown in FIG. 11B.

Figure 12A:
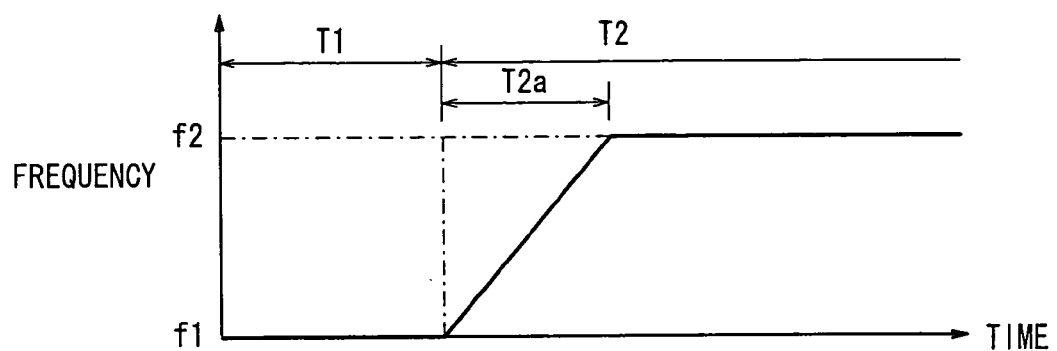
FIG. 12A is a diagram showing how the frequency of switching pulses is changed by a frequency setting circuit based on the first data characteristic curve.
Figure 12B:
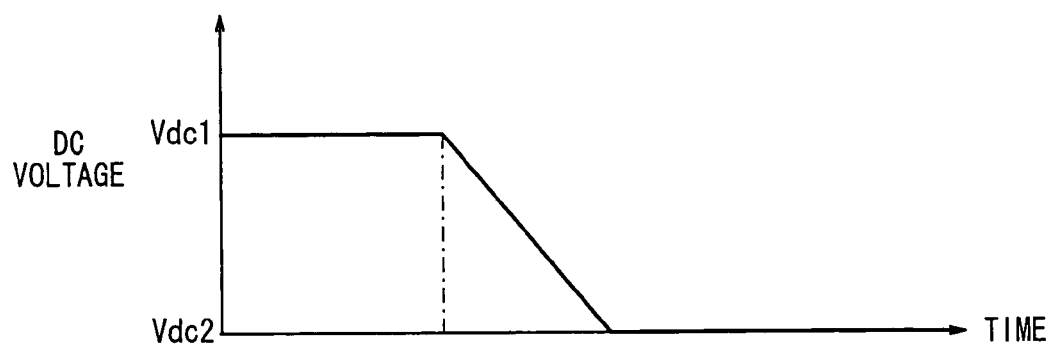
FIG. 12B is a diagram showing how the output voltage of a DC-to-DC converter is changed by a DC voltage setting circuit based on the first data characteristic curve.

For example, it is assumed that the frequency setting circuit 52 employs the first data characteristic curve shown in FIG. 2A. If the DC voltage setting circuit 84 employs the first data characteristic curve shown in FIG. 11A, then, as shown in FIGS. 12A and 12B, the switching pulses Pc are output at the first frequency f1 and the DC-to-DC converter 80 outputs the first DC voltage Vdc1 in the first period T1. In the initial stage T2a of the second period T2, the frequency of the switching pulses Pc increases at a constant rate per unit time from the first frequency f1 to the second frequency f2, and the DC voltage Vdc output from the DC-to-DC converter 80 decreases at a constant rate per unit time from the first DC voltage Vdc1 to the second DC voltage Vdc2.

When the frequency of the switching pulses Pc reaches the second frequency f2 and the DC-to-DC converter 80 outputs the second DC voltage Vdc2, the switching pulses Pc keep the second frequency f2 and the second DC voltage Vdc2.

Figure 13A:
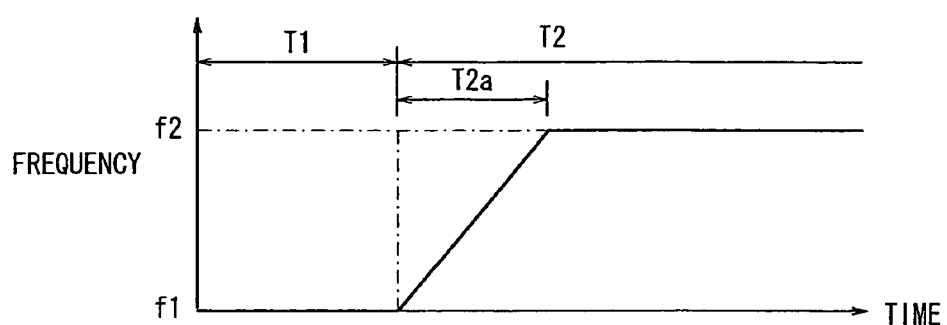
FIG. 13A is a diagram showing how the frequency of switching pulses is changed by the frequency setting circuit based on the second data characteristic curve.
Figure 13B:
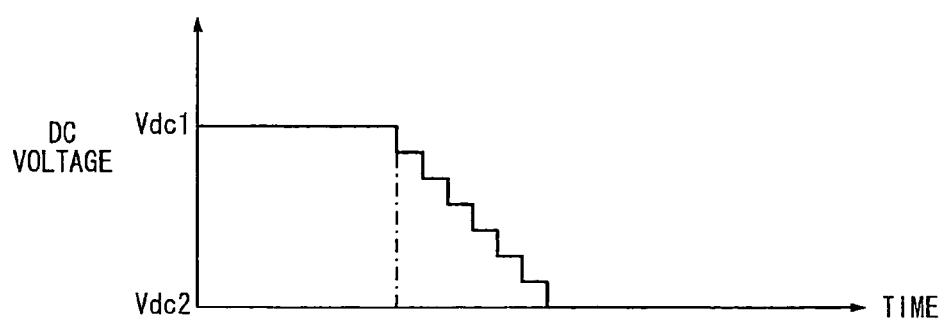
FIG. 13B is a diagram showing how the output voltage of the DC-to-DC converter is changed by the DC voltage setting circuit based on the second data characteristic curve.

If the DC voltage setting circuit 84 employs the second data characteristic curve shown in FIG. 11B, then, as shown in FIGS. 13A and 13B, the switching pulses Pc are output at the first frequency f1 and the DC-to-DC converter 80 outputs the first DC voltage Vdc1 in the first period T1. In the initial stage T2a of the second period T2, the frequency of the switching pulses Pc increases at a constant rate per unit time from the first frequency f1 to the second frequency f2, and the DC voltage Vdc output from the DC-to-DC converter 80 decreases stepwise regularly or irregularly from the first DC voltage Vdc1 to the second DC voltage Vdc2.

When the frequency of the switching pulses Pc reaches the second frequency f2 and the DC-to-DC converter 80 outputs the second DC voltage Vdc2, the switching pulses Pc keep the second frequency f2 and the DC-to-DC converter 80 keeps the second DC voltage Vdc2.

The voltage, current, and electric power need to be controlled for stabilizing the electric discharge in the discharge lamp 36. The voltage applied across the discharge lamp 36 may possibly vary due to changes in the battery voltage. The third discharge lamp energizing circuit 10C is capable of controlling the voltage, current, and electric power supplied to the discharge lamp 36 against disturbances such as changes in the battery voltage.

As with the first discharge lamp energizing circuit 10A, the third discharge lamp energizing circuit 10C is relatively small in size. The period of time spent until the impedance in the discharge lamp 36 is stabilized is reduced under frequency control and DC voltage control performed by the control circuit 14. The starting time and the restarting time of the discharge lamp 36 can thus be reduced.

In the above embodiment, the DC voltage Vdc output from the DC-to-DC converter 80 is changed linearly or stepwise from the first DC voltage Vdc1 to the second DC voltage Vdc2. Alternatively, the DC voltage Vdc output from the DC-to-DC converter 80 may be changed instantaneously from the first DC voltage Vdc1 to the second DC voltage Vdc2.

The control circuit 14 may include all of the switching control circuit 50, the frequency setting circuit 52, the duty ratio setting circuit 70 (see FIG. 6), and the DC voltage setting circuit 84 (see FIG. 10), so that the frequency of the switching pulses Pc may change linearly or stepwise from the first frequency f1 to the second frequency f2, the duty ratio of the switching pulses Pc may be changed linearly or stepwise from the first duty ratio D1 to the second duty ratio D2, and the DC voltage Vdc output from the DC-to-DC converter 80 may be changed linearly or stepwise from the first DC voltage Vdc1 to the second DC voltage Vdc2.

The pulse generating circuit 12 may comprise, other than the circuit arrangement shown in each of FIGS. 1, 6, and 10, a pulse generating circuit 12A according to a first modification shown in FIG. 14 (hereinafter referred to as "first pulse generating circuit 12A"), or a pulse generating circuit 12B according to a second modification shown in FIG. 17 (hereinafter referred to as "second pulse generating circuit 12B"), or a pulse generating circuit 12C according to a third modification shown in FIG. 20 (hereinafter referred to as "third pulse generating circuit 12C").

Figure 14:
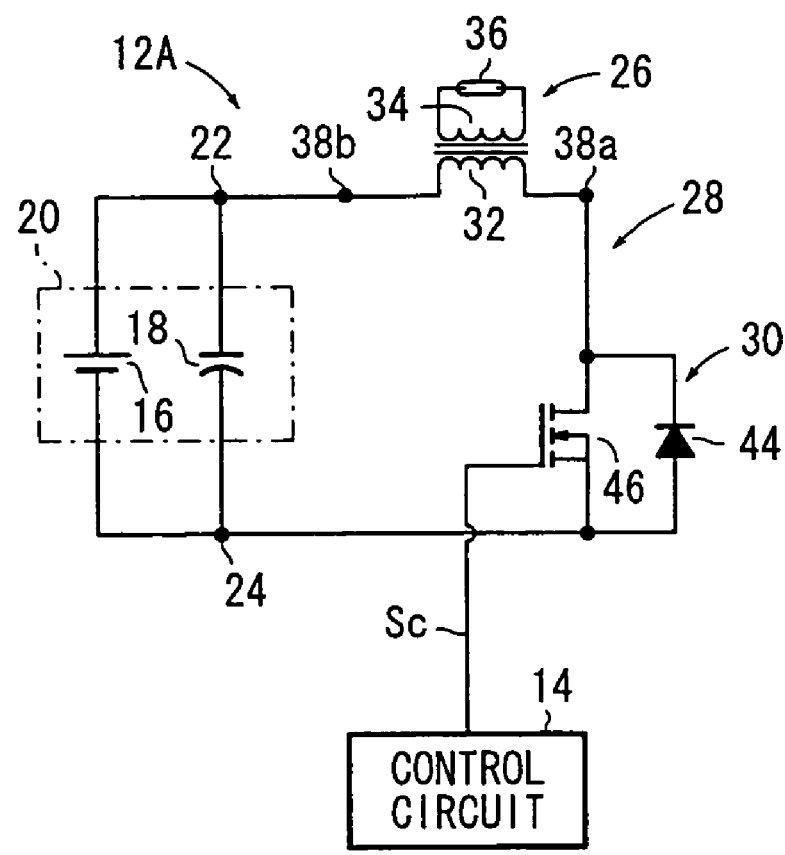
FIG. 14 is a circuit diagram, partly in block form, of a pulse generating circuit according to a first modification.
Figure 15A:
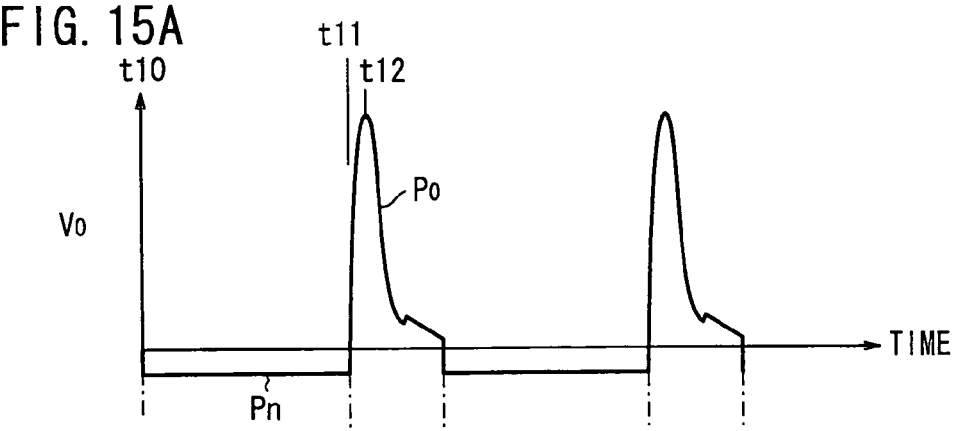
FIG. 15A is a diagram showing the waveform of high-voltage pulses which are supplied to a discharge lamp by switching pulses having a first frequency in the pulse generating circuit according to the first modification.
Figure 15B:
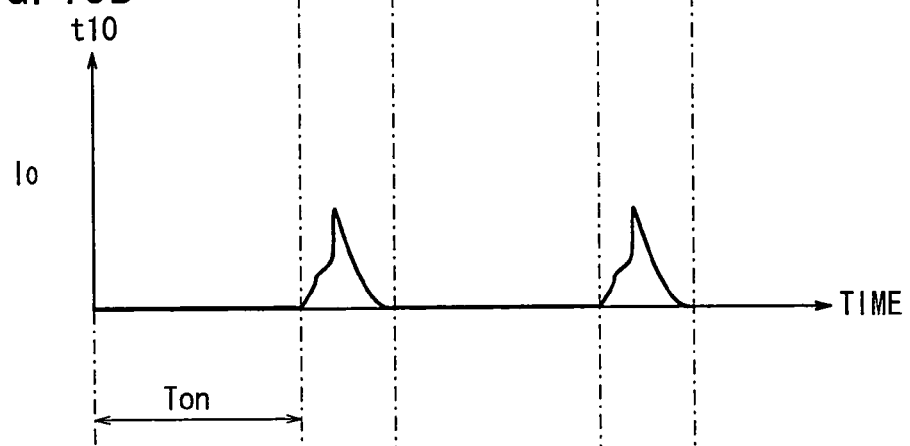
FIG. 15B is a diagram showing the waveform of a current which is supplied to the discharge lamp by the switching pulses having the first frequency in the pulse generating circuit according to the first modification.
Figure 15C:
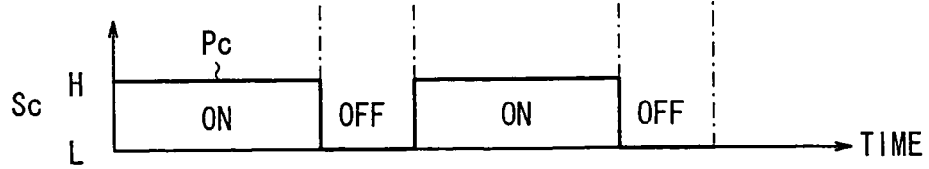
FIG. 15C is a diagram showing the waveform of a switching control signal.

As shown in FIG. 14, the first pulse generating circuit 12A has the DC power supply unit 20, the transformer 26 connected in series to both terminals of the DC power supply unit 20, and the second semiconductor switch 30.

Operation of the first pulse generating circuit 12A will be described below with reference to FIGS. 15A through 16C.

First, when the high-voltage pulses Po having the first frequency f1 are output, the first pulse generating circuit 12A operates as follows: During a period Ton in which the second semiconductor switch 30 is turned on from time t10, a constant negative voltage, i.e., a negative pulse Pn, is output across the secondary winding 34 (see FIG. 15A). Almost no current Io flows through the secondary winding 34 during the period Ton, i.e., the current Io is approximately 0 (A) (see FIG. 15B).

When the second semiconductor switch 30 is subsequently turned off at time t11, the level of the output voltage Vo sharply rises under the induced electromotive force generated by the transformer 26, the circuit outputting a voltage of opposite polarity (positive polarity) having a positive voltage peak level (positive pulse Po). The current Io flowing through the secondary winding 34 also has a peak level with a slight delay.

Figure 16A:
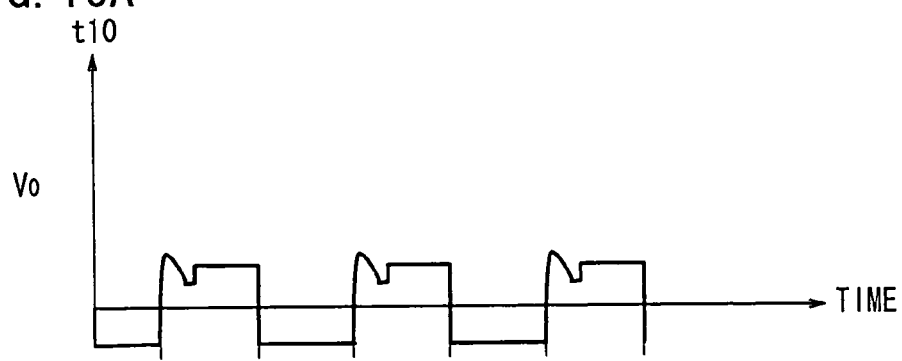
FIG. 16A is a diagram showing the waveform of high-voltage pulses which are supplied to a discharge lamp by switching pulses having a second frequency in the pulse generating circuit according to the first modification.
Figure 16B:
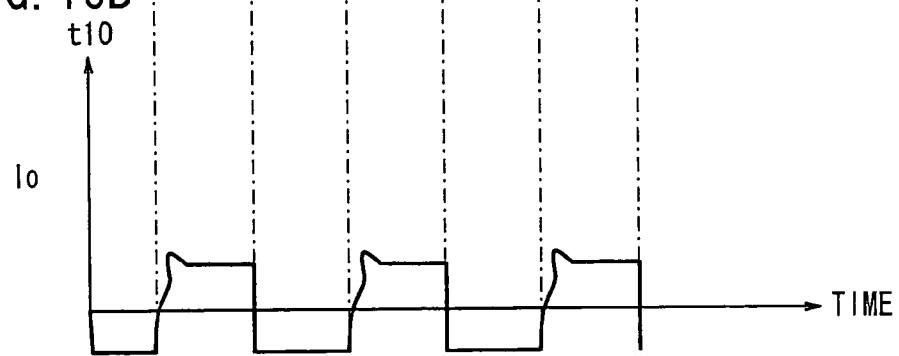
FIG. 16B is a diagram showing the waveform of a current which is supplied to the discharge lamp by the switching pulses having the second frequency in the pulse generating circuit according to the first modification.
Figure 16C:
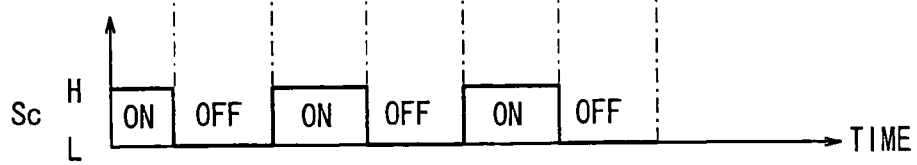
FIG. 16C is a diagram showing the waveform of a switching control signal.

When the frequency of the high-voltage pulses Po is changed to the second frequency f2, as shown in FIGS. 16A through 16C, since the second semiconductor switch 30 is turned on in shorter periods, the amount of electromagnetic energy that is stored in the transformer 26 while the second semiconductor switch 30 is being turned on is smaller than when the frequency of the high-voltage pulses Po is the first frequency f1. The peak level of the high-voltage pulse Po at the time the second semiconductor switch 30 is turned off is also lower.

As with the pulse generating circuit 12, if the time in which the second semiconductor switch 30 is turned on and the time in which the second semiconductor switch 30 is turned off are the same as each other, i.e., if the duty ratio of the switching pulses Pc is 50%, and circuit constants are selected to apply the voltage represented by the product of the current Io flowing through the primary winding 32 and the impedance R of the discharge lamp 36, to the discharge lamp 36, then the pulse generating circuit 12A can output identical positive and negative voltages to be applied to the discharge lamp 36. With this arrangement, wear on the electrodes within the discharge lamp 36 is reduced for thereby increasing the service life of the discharge lamp 36.

For example, it is assumed that the duty ratio of the switching pulses Pc is 50%. When a certain period of time has elapsed from the time the frequency of the high-voltage pulses Po reaches the second frequency f2, the absolute values of the negative and positive peak levels of the high-voltage pulses Po are substantially the same as each other. If the discharge lamp 36 is in an arc discharge environment (current, temperature, etc.) at this time, then a steady discharge state is developed in the discharge lamp 36, causing an arc discharge therein. When an arc discharge is caused in the discharge lamp 36, light is stably emitted from the discharge lamp 36.

The second pulse generating circuit 12B will be described below with reference to FIGS. 17 through 19C.

Figure 17:
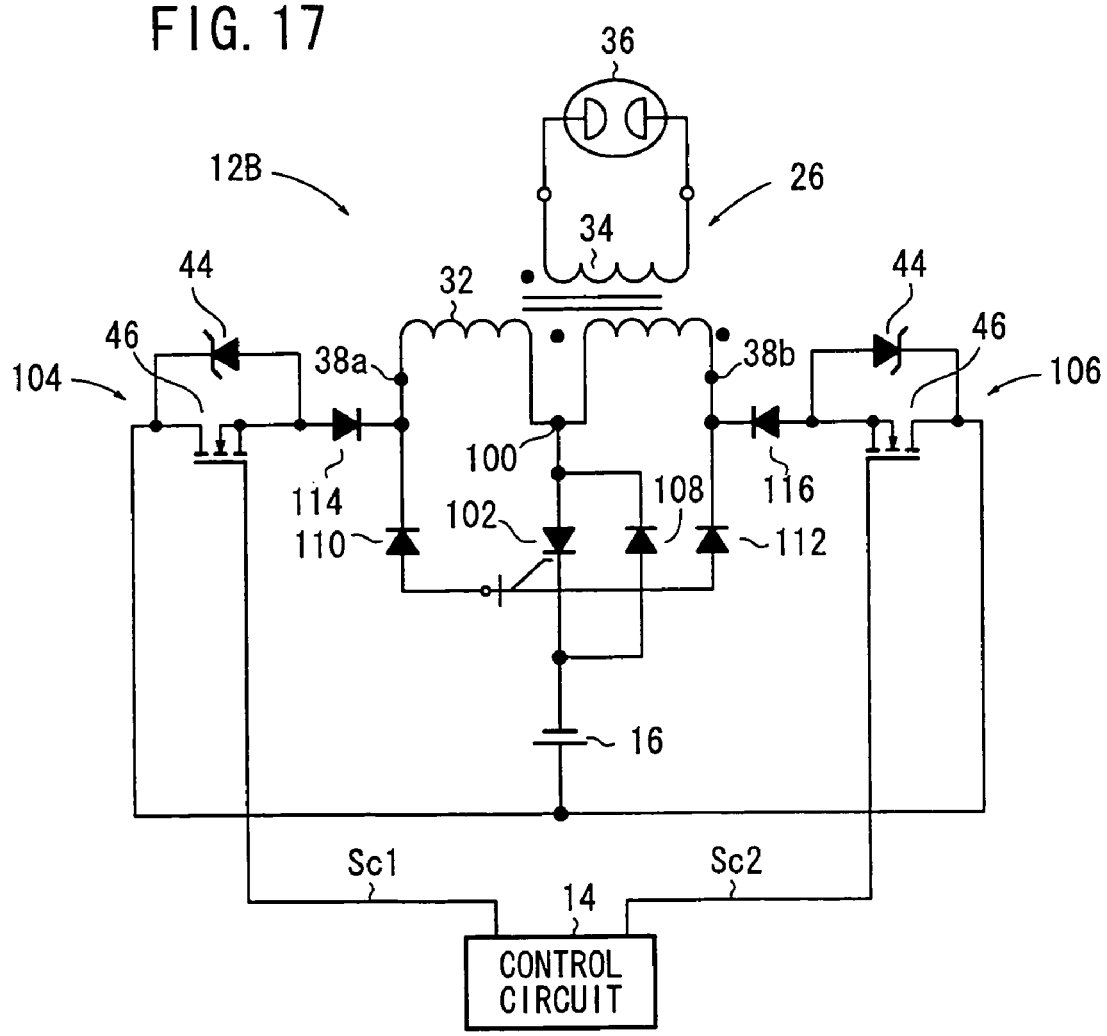
FIG. 17 is a circuit diagram, partly in block form, of a pulse generating circuit according to a second modification.

As shown in FIG. 17, the second pulse generating circuit 12B has a tap connection terminal 100 on the primary winding 32 of the transformer 26. The second pulse generating circuit 12B comprises the DC power supply 16, a third semiconductor switch 102 connected between a negative terminal of the DC power supply 16 and the tap connection terminal 100 for drawing a current flowing through the primary winding 32 into the DC power supply 16, a fourth semiconductor switch 104 connected between a terminal 38a of the primary winding 32 and a positive terminal of the DC power supply 16, and a fifth semiconductor switch 106 connected between another terminal 38b of the primary winding 32 and the positive terminal of the DC power supply 16.

Figure 6:
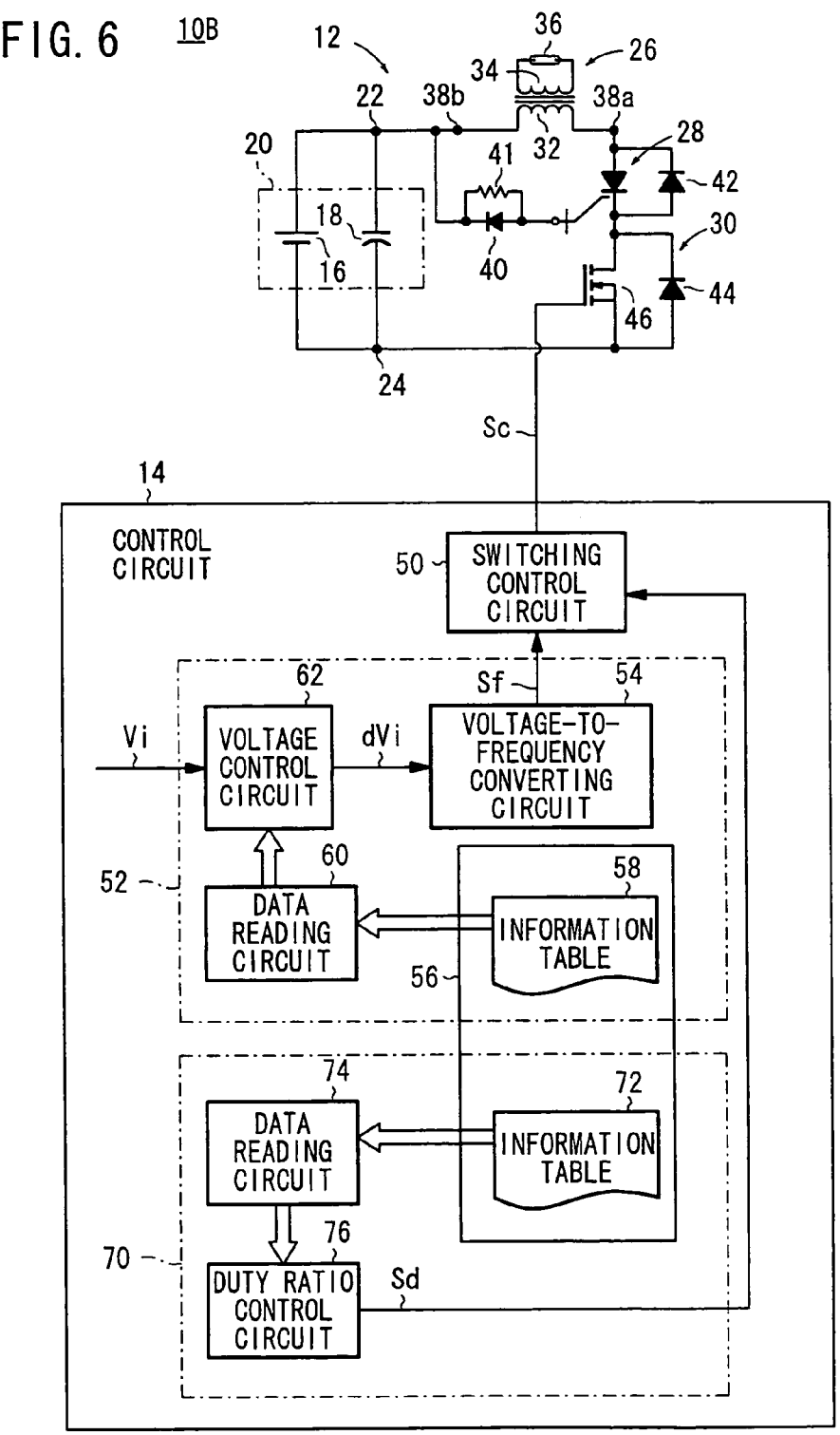
FIG. 6 is a circuit diagram, partly in block form, of a discharge lamp energizing circuit according to a second embodiment of the present invention.
Figure 10:
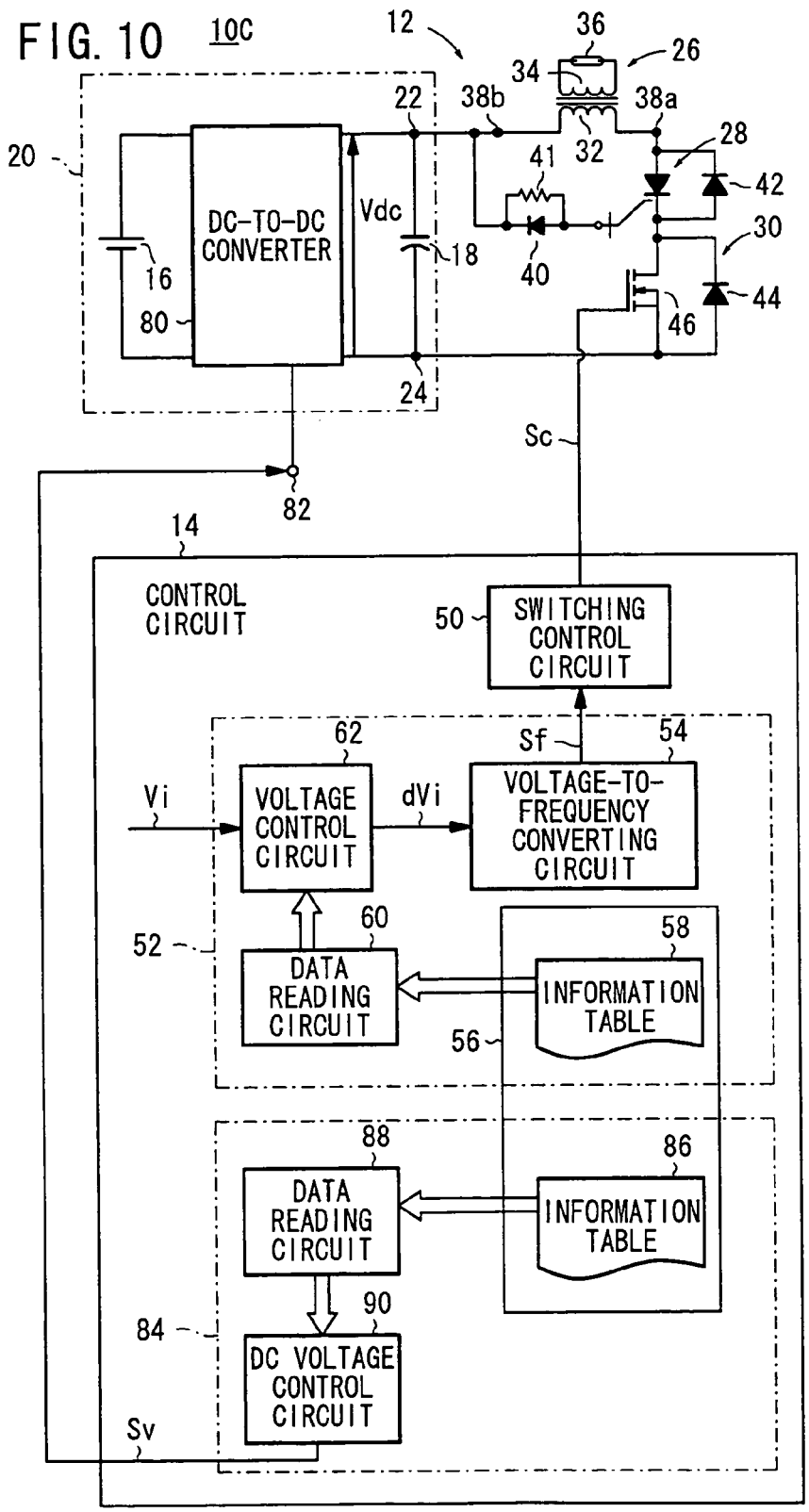
FIG. 10 is a circuit diagram, partly in block form, of a discharge lamp energizing circuit according to a third embodiment of the present invention.

The third semiconductor switch 102 may comprise a semiconductor switch, e.g., an SI thyristor, that is the same as the first semiconductor switch 28 in the pulse generating circuit 12 shown in FIGS. 1, 6, 10. Each of the fourth semiconductor switch 104 and the fifth semiconductor switch 106 may comprise a semiconductor switch, e.g., a power metal oxide semiconductor field effect transistor 46 combined with the inversely parallel connected avalanche diode 44, that is the same as the second semiconductor switch 30 in the pulse generating circuit 12 shown in FIG. 1, 6, 10.

A first diode 108 is connected between the cathode and anode of the third semiconductor switch 102 in a manner such that the first diode 108 has a cathode connected to the anode of the third semiconductor switch 102 and an anode to the cathode of the third semiconductor switch 102. A second diode 110 is connected between the gate of the third semiconductor switch 102 and the terminal 38a of the primary winding 32 in a manner such that the second diode 110 has a cathode connected to the terminal 38a of the primary winding 32 and an anode to the gate of the third semiconductor switch 102. A third diode 112 is connected between the gate of the third semiconductor switch 102 and the terminal 38b of the primary winding 32 in a manner such that the third diode 112 has a cathode connected to the terminal 38b of the primary winding 32 and an anode to the gate of the third semiconductor switch 102.

A fourth diode 114 is connected to the source of the fourth semiconductor switch 104 and the terminal 38a of the primary winding 32 in a manner such that the fourth diode 114 has an anode connected to the source of the fourth semiconductor switch 104 and a cathode to the terminal 38a of the primary winding 32. A fifth diode 116 is connected between the source of the fifth semiconductor switch 106 and the terminal 38b of the primary winding 32 in a manner such that the fifth diode 116 has an anode connected to the source of the fifth semiconductor switch 106 and a cathode to the terminal 38b of the primary winding 32.

The fourth semiconductor switch 104 and the fifth semiconductor switch 106 are supplied with a first switching control signal Sc1 and a second switching control signal Sc2, respectively, from the control circuit 14.

Operation of the second pulse generating circuit 12B will briefly be described below with reference to FIGS. 18A through 19D.

Figure 18A:
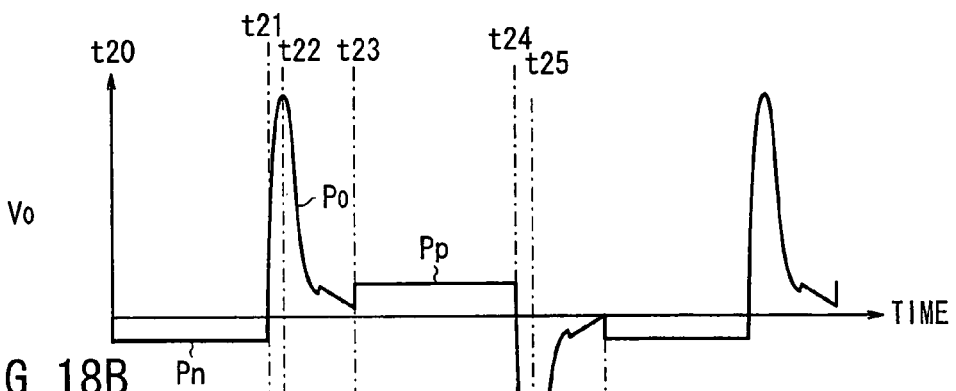
FIG. 18A is a diagram showing the waveform of high-voltage pulses which are supplied to a discharge lamp by switching pulses having a first frequency in the pulse generating circuit according to the second modification.
Figure 18B:
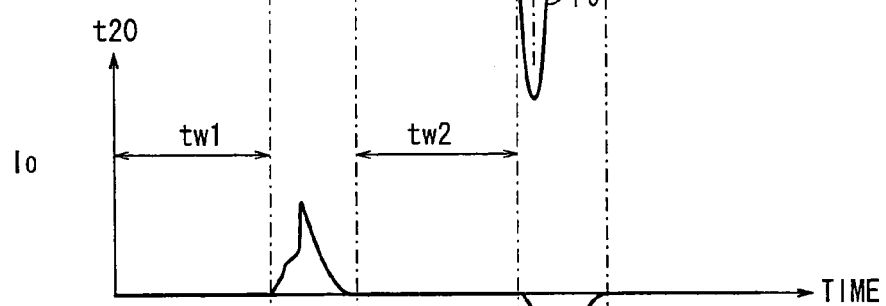
FIG. 18B is a diagram showing the waveform of a current which is supplied to the discharge lamp by the switching pulses having the first frequency in the pulse generating circuit according to the second modification.
Figure 18C:
FIG. 18C is a diagram showing the waveform of a switching control signal.

First, when the high-voltage pulses Po having the first frequency f1 are output, the second pulse generating circuit 12B operates as follows: First, the first switching control signal Sc1 goes high in level, as shown in FIG. 18C. During a period tw1 in which the fourth semiconductor switch 104 is turned on from time t20, a constant negative voltage, i.e., a negative pulse Pn, is output across the secondary winding 34 (see FIG. 18A). Almost no current Io flows through the secondary winding 34 during the period tw1, i.e., the current Io is approximately 0 (A) (see FIG. 18B).

When the first switching control signal Sc1 goes low in level at time t21, as shown in FIG. 18C, turning off the fourth semiconductor switch 104, the third semiconductor switch 102 is opened. The current flowing through the primary winding 32 is cut off, and the level of the output voltage Vo sharply rises under the induced electromotive force generated by the transformer 26, the circuit outputting a positive high-voltage pulse Po having a positive voltage peak level (e.g., in the range from 18 to 20 kV) and a short pulse duration at time t22.

Figure 18D:
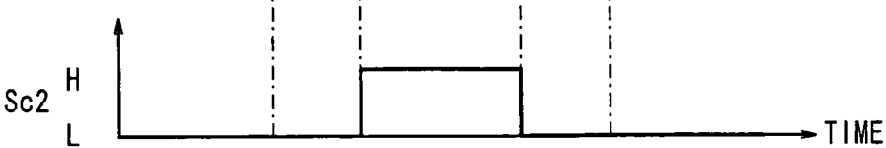
FIG. 18D is a diagram showing the waveform of a switching control signal.

Thereafter, at time t23, as shown in FIG. 18D, the second switching control signal Sc2 goes high in level. During a period tw2 in which the fifth semiconductor switch 106 is turned on, as shown in FIG. 18A, a constant positive voltage, i.e., a positive pulse Pp, is output across the secondary winding 34. Almost no current Io flows through the secondary winding 34 during the period tw2, i.e., the current Io is approximately 0 (A) (see FIG. 18B).

When the fifth semiconductor switch 106 is turned off at time t24, the third semiconductor switch 102 is opened. The current Io flowing through the primary winding 32 is cut off, and the level of the output voltage Vo sharply drops under the induced electromotive force generated by the transformer 26, the circuit outputting a negative pulse Po having a negative voltage peak level (e.g., in the range from −18 to −20 kV) and a short pulse duration at time t25.

Figure 19A:
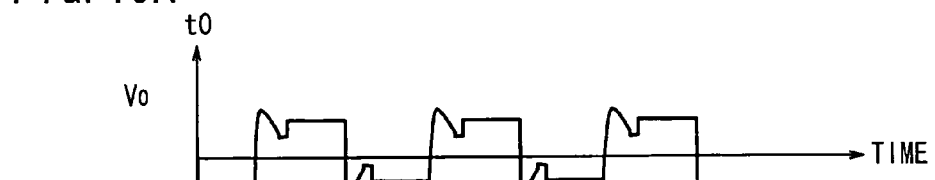
FIG. 19A is a diagram showing the waveform of high-voltage pulses which are supplied to the discharge lamp by switching pulses having a second frequency in the pulse generating circuit according to the second modification.
Figure 19B:
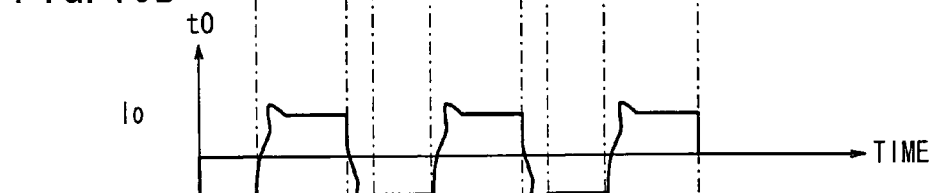
FIG. 19B is a diagram showing the waveform of a current which is supplied to the discharge lamp by the switching pulses having the second frequency in the pulse generating circuit according to the second modification.
Figure 19C:
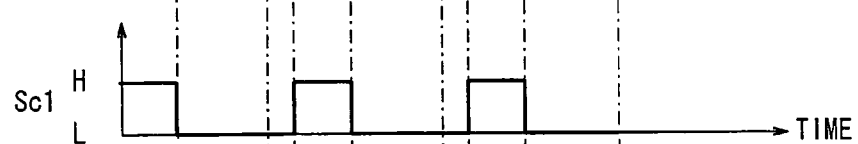
FIG. 19C is a diagram showing the waveform of a switching control signal.
Figure 19D:
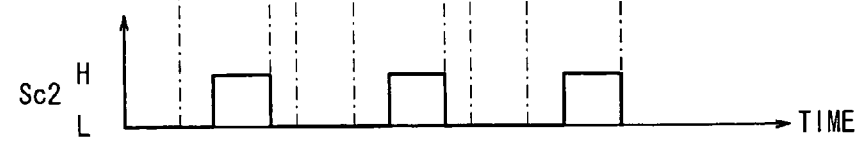
FIG. 19D is a diagram showing the waveform of a switching control signal.

When the frequency of the high-voltage pulses Po is changed to the second frequency f2, as shown in FIGS. 19C and 19D, since the fourth semiconductor switch 104 and the fifth semiconductor switch 106 are turned on in shorter periods, the amount of electromagnetic energy that is stored in the transformer 26 while the third semiconductor switch 102 is being turned on is smaller than when the frequency of the high-voltage pulses Po is the first frequency f1. The peak levels of the positive and negative high-voltage pulses Po at the time the third semiconductor switch 102 is turned off are also lower.

For example, it is assumed that the duty ratio of the switching pulses Pc is 50%. Since the high-voltage pulses Po are output in both positive and negative directions, when the frequency of the high-voltage pulses Po reaches the second frequency f2, the impedance in the discharge lamp 36 is lowered, and the absolute values of the negative and positive peak levels of the high-voltage pulses Po are substantially the same as each other. Thereafter, constant electric power control is performed on the discharge lamp 36. After elapse of a certain period of time, a steady discharge state is developed in the discharge lamp 36, and light is stably emitted from the discharge lamp 36.

With the second pulse generating circuit 12B, therefore, the period of time consumed after the frequency of the high-voltage pulses Po has reached the second frequency f2 until the absolute values of the negative and positive peak levels of the high-voltage pulses Po become substantially the same as each other is greatly reduced, making the period of time required until stable light emission is accomplished by the discharged lamp 36 shorter than with the pulse generating circuit 12 shown in FIG. 1, 6, 10.

The control circuit 14 stops supplying the first switching control signal Sc1 and the second switching control signal Sc2 to the fourth semiconductor switch 104 and the fifth semiconductor switch 106, respectively, to de-energize the discharge lamp 36, and thereafter resumes supplying the first switching control signal Sc1 and the second switching control signal Sc2 to the fourth semiconductor switch 104 and the fifth semiconductor switch 106, respectively. In such a case, as described above, high-voltage pulses Po are initially generated based on the switching pulses Pc having the first frequency f1 to cause the discharge lamp 36 to develop an arc discharge therein, thereby lowering the impedance in the discharge lamp 36. Thereafter, the electric power supplied to the discharge lamp 36 is controlled by the switching pulses Pc having the second frequency f2 to sustain the arc discharge in the discharge lamp 36 for thereby enabling the discharge lamp 36 to emit light when it is restarted.

The second pulse generating circuit 12B has two of the second semiconductor switches 30 in the pulse generating circuit 12, i.e., the fourth semiconductor switch 104 and the fifth semiconductor switch 106. Consequently, the frequency of the switching pulses Pc supplied to each of the fourth semiconductor switch 104 and the fifth semiconductor switch 106 may be half the frequency of the switching pulses Pc in the pulse generating circuit 12.

If the control circuit 14 is combined with the second pulse generating circuit 12B, then the data in the frequency information table 58, the duty ratio information table 72, and the DC voltage information table 86 may be replaced with data representative of one-half of the first frequency f1 and one-half of the second frequency f2, or divide-by-2 frequency dividers may be inserted between the control circuit 14 and the fourth semiconductor switch 104 and between the control circuit 14 and the fifth semiconductor switch 106.

As described above, in as much as the second pulse generating circuit 12B is capable of outputting the high-voltage pulses Po in both positive and negative directions, unlike the pulse generating circuit 12 shown in FIG. 1, 6, 10, the period of time required until stable light emission is accomplished by the discharged lamp 36 is greatly reduced.

Furthermore, the burden on the second pulse generating circuit 12B is reduced because the switching pulses Pc may be controlled at one-half of the frequency of the high-voltage pulses Po.

The third pulse generating circuit 12C will be described below with reference to FIG. 20.

Figure 20:
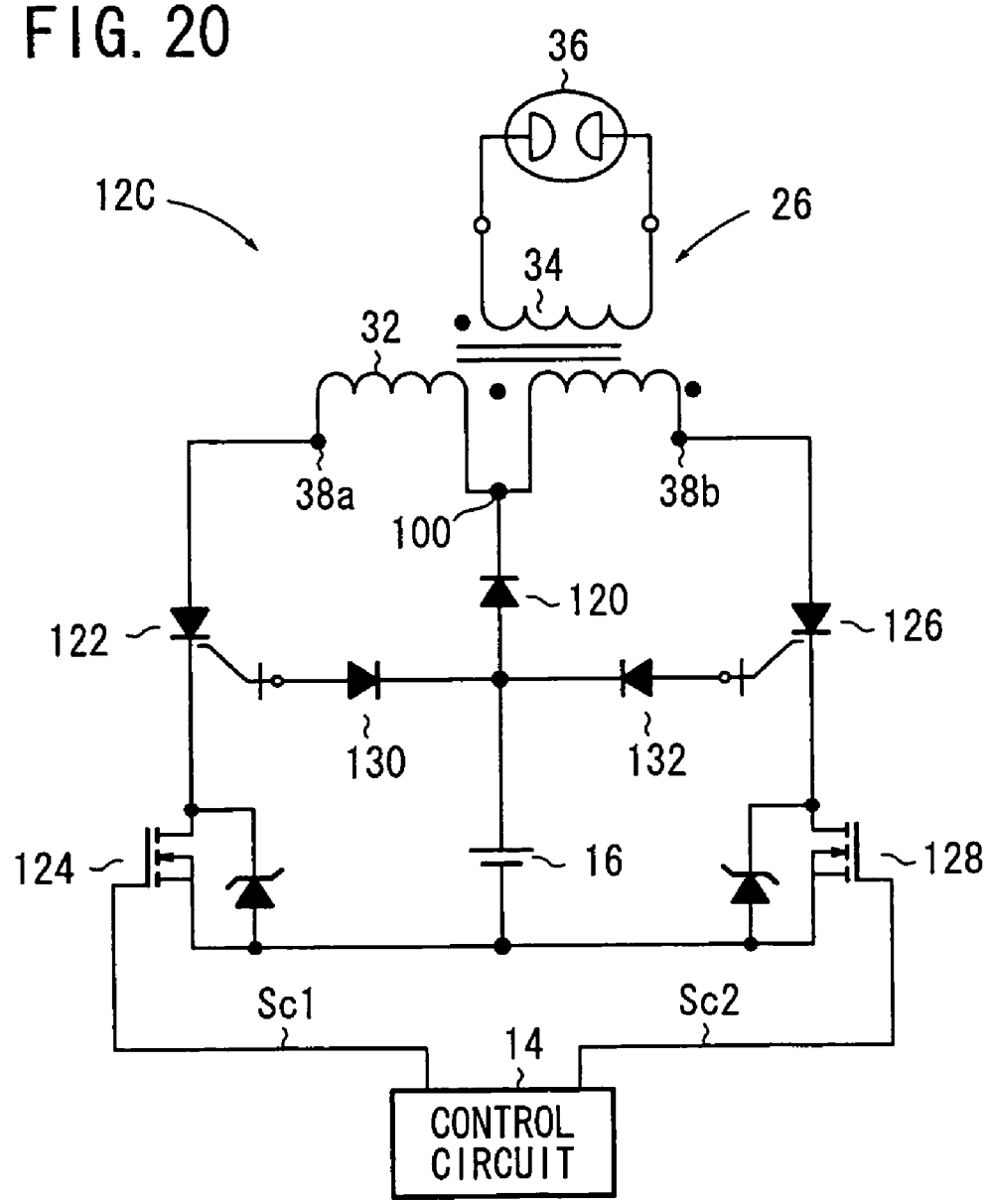
FIG. 20 is a circuit diagram, partly in block form, of a pulse generating circuit according to a third modification.

As shown in FIG. 20, the third pulse generating circuit 12C has a tap connection terminal 100 on the primary winding 32 of the transformer 26. The third pulse generating circuit 12C comprises the DC power supply 16, a diode 120 forward-connected between the positive terminal of the DC power supply 16 and the tap connection terminal 100, a sixth semiconductor switch 122 connected between the terminal 38a of the primary winding 32 and the negative terminal of the DC power supply 16 for allowing the current from the DC power supply 16 to flow from the tap connection terminal 100 to the terminal 38a, a seventh semiconductor switch 124 for turning on and off the sixth semiconductor switch 122, an eighth semiconductor switch 126 connected between the terminal 38b of the primary winding 32 and the negative terminal of the DC power supply 16 for allowing the current from the DC power supply 16 to flow from the tap connection terminal 100 to the terminal 38b, and a ninth semiconductor switch 128 for turning on and off the eighth semiconductor switch 126.

Each of the sixth semiconductor switch 122 and the eighth semiconductor switch 126 may comprise a semiconductor switch, e.g., an SI thyristor, that is the same as the first semiconductor switch 28 in the pulse generating circuit 12 shown in FIG. 1, 6, 10. Each of the seventh semiconductor switch 124 and the ninth semiconductor switch 128 may comprise a semiconductor switch, e.g., a power metal oxide semiconductor field effect transistor combined with an inversely parallel connected avalanche diode, that is the same as the second semiconductor switch 30 in the pulse generating circuit 12 shown in FIG. 1, 6, 10.

A sixth diode 130 is connected between the gate of the sixth semiconductor switch 122 and the anode of the diode 120 in a manner such that the sixth diode 130 has an anode connected to the gate of the sixth semiconductor switch 122 and a cathode to the anode of the diode 120. A seventh diode 132 is connected between the gate of the eighth semiconductor switch 126 and the anode of the diode 120 in a manner such that the seventh diode 132 has an anode connected to the gate of the eighth semiconductor switch 126 and a cathode to the anode of the diode 120.

Operation of the third pulse generating circuit 12C is essentially the same as the operation of the second pulse generating circuit 12B described above, and will not be described below.

In the third pulse generating circuit 12C, since the high-voltage pulses Po are output in both positive and negative directions, when the frequency of the high-voltage pulses Po reaches the second frequency f2, the impedance in the discharge lamp 36 is lowered, and the absolute values of the negative and positive peak levels of the high-voltage pulses Po are substantially the same as each other. Thereafter, constant electric power control is performed on the discharge lamp 36. After elapse of a certain period of time, a steady discharge state is developed in the discharge lamp 36, and light is stably emitted from the discharge lamp 36.

With the third pulse generating circuit 12C, therefore, the period of time consumed after the frequency of the high-voltage pulses Po has reached the second frequency f2 until the absolute values of the negative and positive peak levels of the high-voltage pulses Po become substantially the same as each other is greatly reduced, making the period of time required until stable light emission is accomplished by the discharged lamp 36 shorter than with the pulse generating circuit 12 shown in FIG. 1, 6, 10.

When the frequency of the high-voltage pulses Po changes from the first frequency f1 to the second frequency f2, the discharge in the discharge lamp 36 is unstable, tending to cause light emission flickering or possibly to cause the discharge lamp 36 to be turned off.

Figure 21:
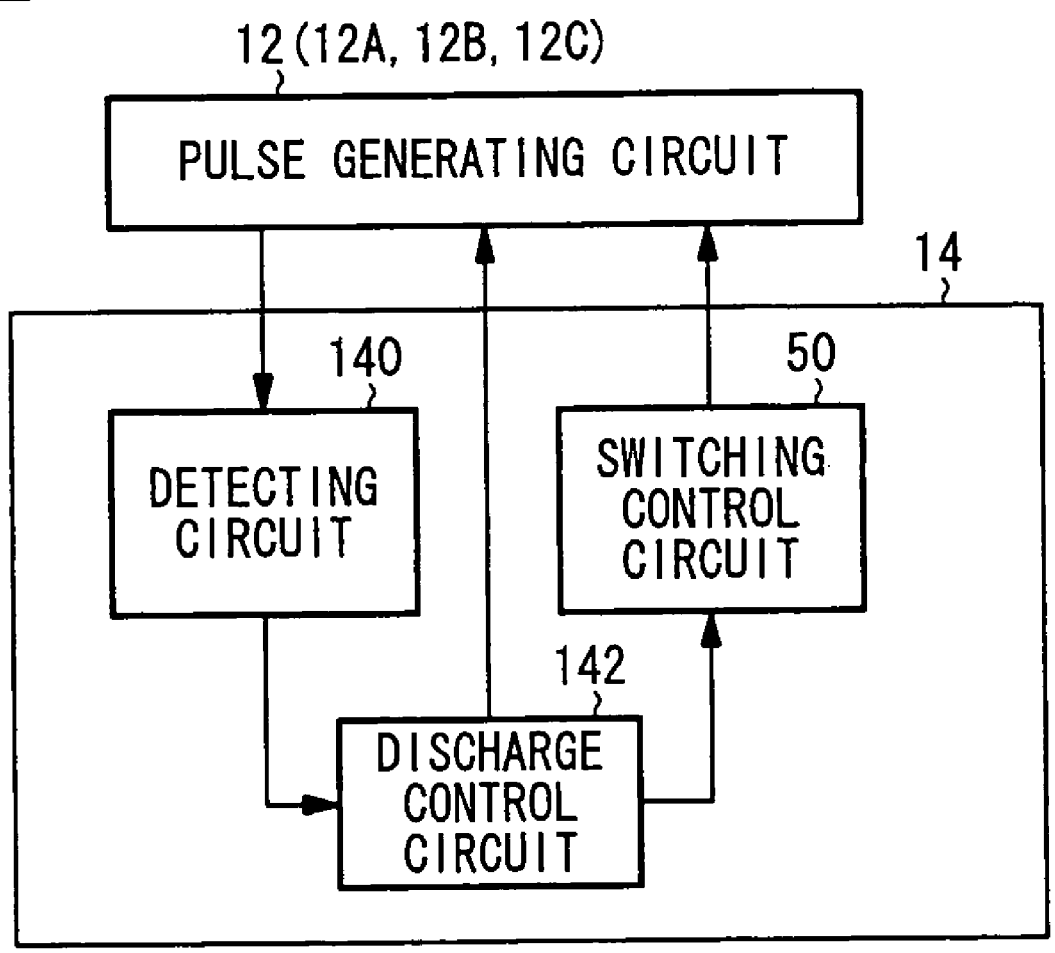
FIG. 21 is a block diagram of a discharge lamp energizing circuit according to a fourth embodiment of the present invention.

In view of such a problem, as shown in FIG. 21, a discharge lamp energizing circuit 10D according to a fourth embodiment of the present invention (hereinafter referred to as "fourth discharge lamp energizing circuit 10D") has a control circuit 14 including a detecting circuit 140 and a discharge control circuit 142 in addition to the switching control circuit 50. In FIG. 21, the pulse generating circuit 12 which is shown as a single block may be the pulse generating circuit 12 shown in FIGS. 1, 6, 10, the first pulse generating circuit 12A shown in FIG. 14, the second pulse generating circuit 12B shown in FIG. 17, or the third pulse generating circuit 12C shown in FIG. 20.

The detecting circuit 140 detects a current value flowing in the pulse generating circuit 12 and/or a voltage value generated by the pulse generating circuit 12 during the initial stage T2a of the second period T2.

The discharge control circuit 142 controls the discharge lamp 36 to develop a substantially steady discharge during the second period T2 based on a value detected by the detecting circuit 140.

Specific examples of the detecting circuit 140 and the discharge control circuit 142 will be described below with reference to FIGS. 22 through 32C.

Figure 22:
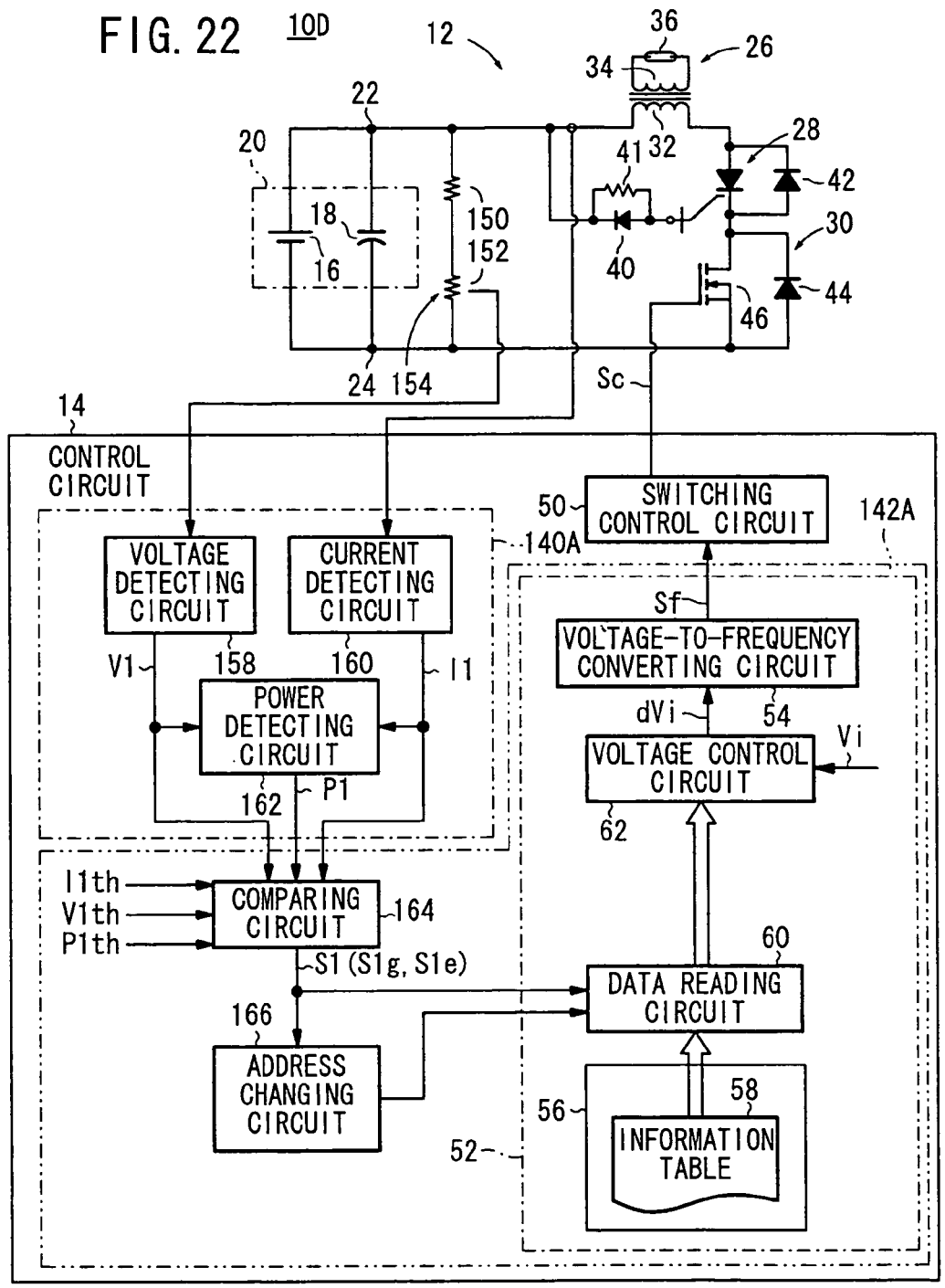
FIG. 22 is a circuit diagram, partly in block form, of the discharge lamp energizing circuit according to the fourth embodiment, particularly a first detecting circuit and a first discharge control circuit thereof.

As shown in FIG. 22, a first detecting circuit 140A, which represents a first specific example of the detecting circuit 140, comprises a series-connected circuit 154 of two resistors 150, 152 connected in parallel to the capacitor 18 of the DC power supply unit 20, a voltage detecting circuit 158 for detecting a voltage across one 152 of the two resistors 150, 152, a current detecting circuit 160 for detecting a transformer current value flowing through the primary winding 32 of the transformer 26, and a power detecting circuit 162 for detecting a first electric power value P1 based on a voltage value V1 detected by the voltage detecting circuit 158 and a transformer current value I1 detected by the current detecting circuit 160. The first detecting circuit 140A may have only the voltage detecting circuit 158 or only the current detecting circuit 160.

As shown in FIG. 22, a first discharge control circuit 142A, which represents a first specific example of the discharge control circuit 142, comprises the frequency setting circuit 52, a comparing circuit 164, and an address changing circuit 166 for changing the readout address at which data are to be read from the frequency information table 58 by the data reading circuit 60, based on a comparison result S1 from the comparing circuit 164.

The comparing circuit 164 compares the current value I1 detected by the current detecting circuit 160 in the first detecting circuit 140A with a predetermined threshold value (current value) I1th, or compares the voltage value V1 detected by the voltage detecting circuit 158 with a predetermined threshold value (voltage value) V1th, or compares the electric power value P1 detected by the power detecting circuit 162 with a predetermined threshold value (power value) P1th.

The above threshold values (the current value I1th, the voltage value V1th, and the power value P1th) are selected depending on the size of the discharge lamp 36, the circuit constants of the pulse generating circuit 12, the types and characteristics of the first semiconductor switch 28 and the second semiconductor switch 30 which are used.

Figure 23A:
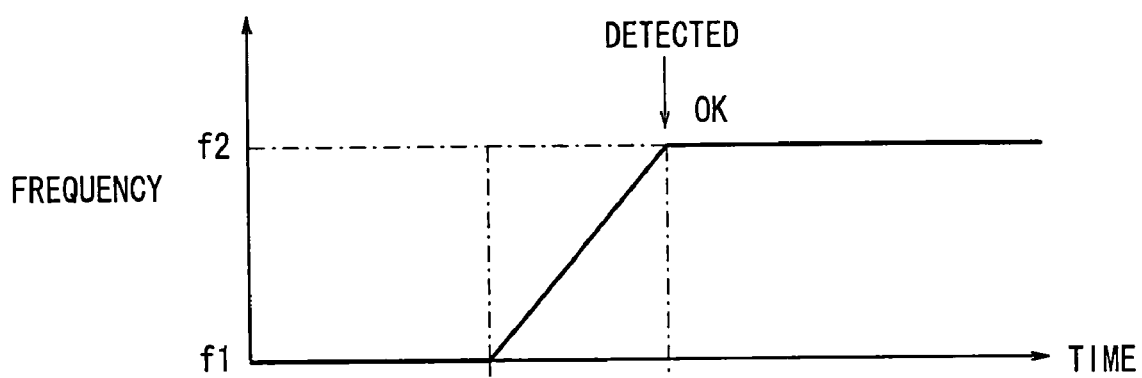
FIG. 23A is a waveform diagram showing the manner in which the first discharge control circuit operates when a normal signal is output from a comparing circuit.
Figure 24A:
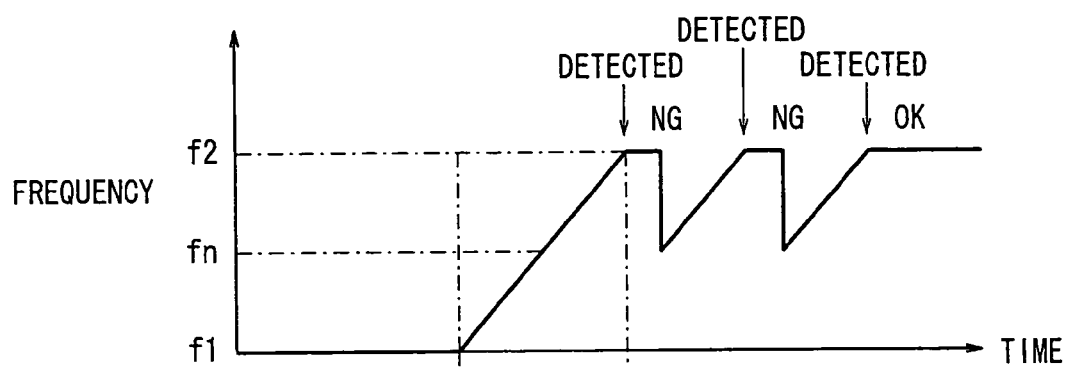
FIG. 24A is a waveform diagram showing the manner in which the first discharge control circuit operates when an abnormal signal is output from a comparing circuit.

As shown in FIGS. 23A and 24A, during the first period T1, the switching pulses Pc having the first frequency f1 are supplied to the second semiconductor switch 30 to cause an arc discharge in the discharge lamp 36. After the initial stage T2a of the second period T2, when the frequency of the switching pulses Pc reaches the second frequency f2, the first detecting circuit 140A detects the current value I1, the voltage value V1, and the power value P1. In FIGS. 23A and 24A, the frequency increase according to the first data characteristic curve, for example, is shown during the initial stage T2a of the second period T2.

The comparing circuit 164 compares the current value I1 from the current detecting circuit 160 with the predetermined threshold value (current value) I1th, or compares the voltage value V1 from the voltage detecting circuit 158 with the predetermined threshold value (voltage value) V1th, or compares the power value P1 from the power detecting circuit 162 with the predetermined threshold value (power value) P1th.

Figure 23B:
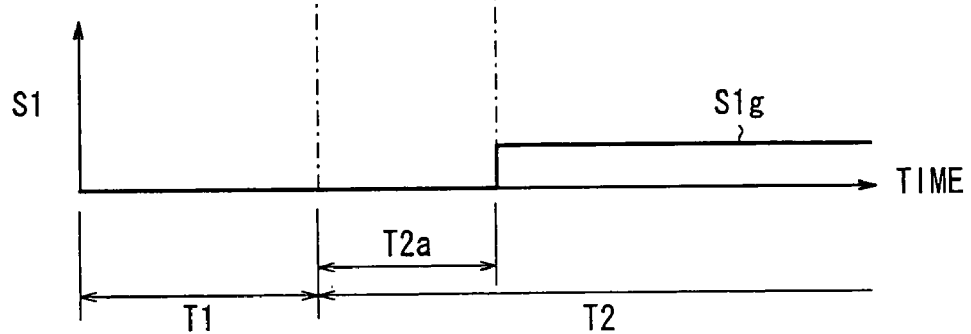
FIG. 23B is a waveform diagram showing the normal signal output from the comparing circuit.

As shown in FIG. 23A, if the current value I1 exceeds the predetermined threshold value I1th, or if the voltage value V1 exceeds the predetermined threshold value V1th, or if the power value P1 exceeds the predetermined threshold value P1th, then the comparing circuit 164 judges that the transition to the arc discharge is completed, and outputs a normal signal S1g (e.g., a high-level signal) shown in FIG. 23B. Based on the normal signal S1g from the comparing circuit 164, the data reading circuit 60 keeps its present output (the maximum value output representing the second frequency f2).

Figure 24B:
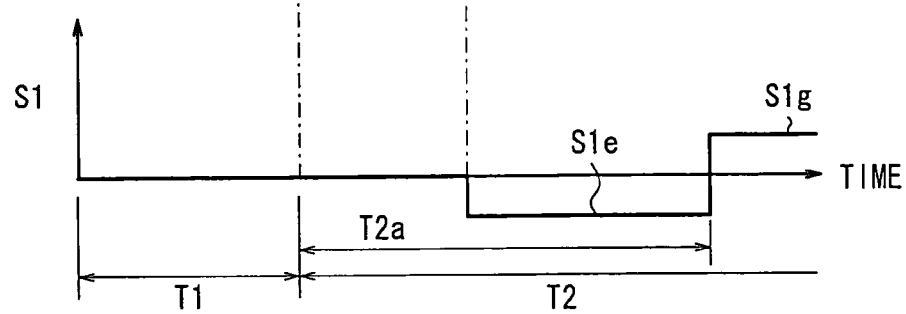
FIG. 24B is a waveform diagram showing the normal signal and the abnormal signal which are output from the comparing circuit.

As shown in FIG. 24A, if the current value I1 is equal to or smaller than the predetermined threshold value I1th, or if the voltage value V1 is equal to or smaller than the predetermined threshold value V1th, or if the power value P1 is equal to or smaller than the predetermined threshold value P1th, then the comparing circuit 164 judges that no sustained arc discharge is achieved, and outputs an error signal S1e (e.g., a low-level signal) shown in FIG. 24B. Based on the error signal S1e from the comparing circuit 164, the address changing circuit 166 changes the readout address for the frequency information table 58 to an address storing a voltage value which corresponds to a frequency fn while the frequency of the switching pulses Pc is increasing up to the second frequency f2 during the initial stage T2a of the second period T2, as shown in FIG. 24A, and supplies the changed address to the data reading circuit 60. The address changing circuit 166 may change the readout address for the frequency information table 58 to an address storing a voltage value which corresponds to the first frequency f1.

The data reading circuit 60 uses the address supplied from the address changing circuit 166 as a readout start address at which data in the frequency information table 58 start to be read, successively reads the data from the frequency information table 58, and supplies the read data to the voltage control circuit 62.

Consequently, if the transition to the arc discharge is not successful even when the frequency of the switching pulses Pc reaches the second frequency f2, the readout start address for the frequency information table 58 is changed to cause the frequency of the switching pulses Pc to return to the frequency fn between the first frequency f1 and the second frequency f2 or to the first frequency f1, after which the frequency of the switching pulses Pc increases up to the second frequency f2. This process will be referred to as a retry process.

When the frequency of the switching pulses Pc reaches the second frequency f2 in the retry process, if the current value I1 from the first detecting circuit 140A is still equal to or lower than the predetermined threshold value I1th, or if the voltage value V1 from the first detecting circuit 140A is still equal to or lower than the predetermined threshold value V1th, or the power value P1 from the first detecting circuit 140A is still equal to or lower than the predetermined threshold value P1th, then the above retry process is repeated.

When the frequency of the switching pulses Pc reaches the second frequency f2 in the retry process, if the current value I1 from the first detecting circuit 140A exceeds the predetermined threshold value I1th, or if the voltage value V1 from the first detecting circuit 140A exceeds the predetermined threshold value V1th, or the power value P1 from the first detecting circuit 140A exceeds the predetermined threshold value P1th, then the comparing circuit 164 outputs the normal signal S1g. The retry process is no longer performed, and the second frequency f2 is sustained.

Figure 25:
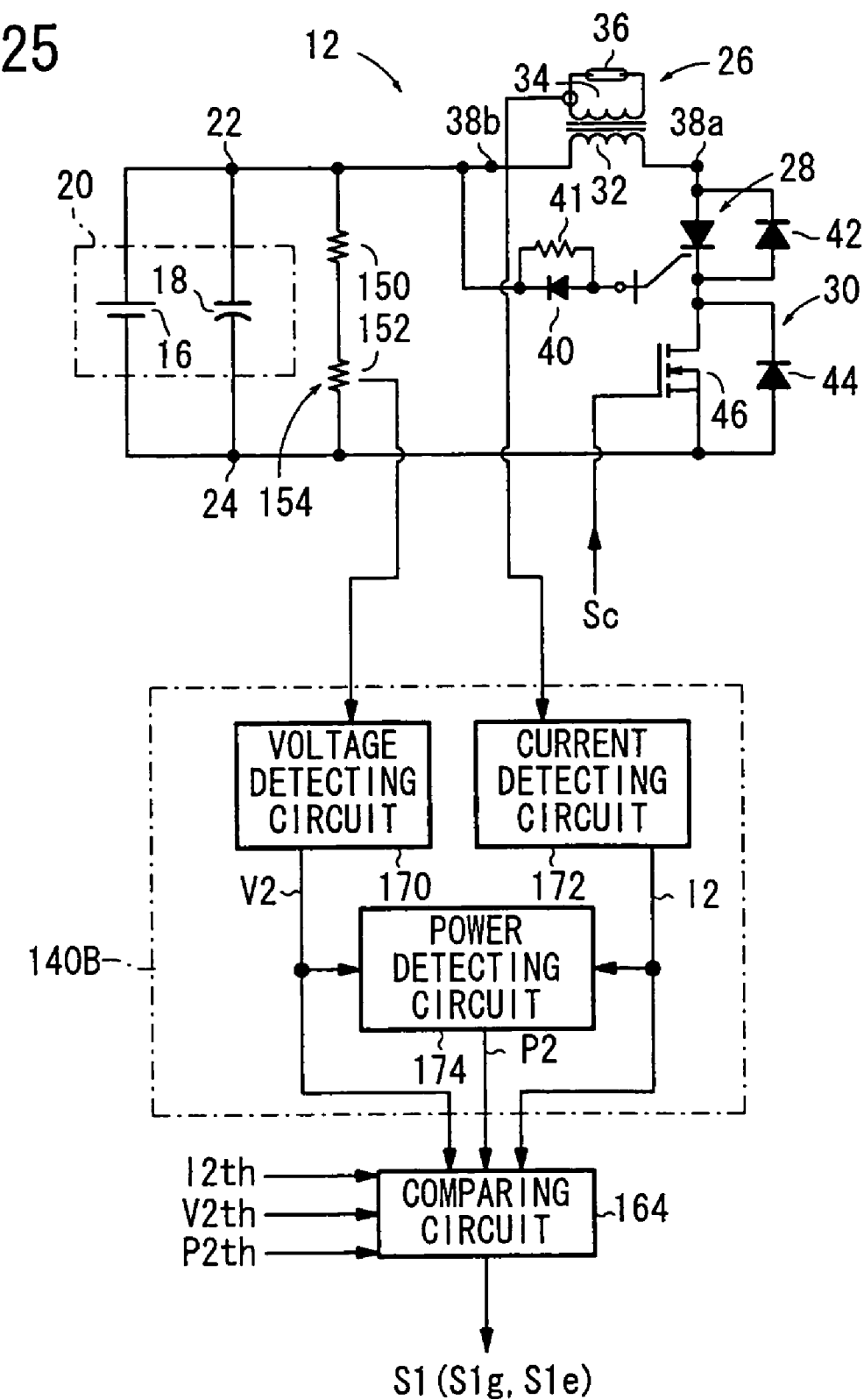
FIG. 25 is a circuit diagram, partly in block form, of a second detecting circuit together with a pulse generating circuit and the comparing circuit.

Other specific examples of the detecting circuit 140 will be described below. As shown in FIG. 25, a second detecting circuit 140B, which represents a second specific example of the detecting circuit 140, comprises the series-connected circuit 154, a voltage detecting circuit 170 for detecting a voltage across one 152 of the two resistors 150, 152 of the series-connected circuit 154, a current detecting circuit 172 for detecting a load current flowing between the secondary winding 34 of the transformer 26 and the discharge lamp 36, and a power detecting circuit 174 for detecting an electric power value P2 based on a voltage value V2 detected by the voltage detecting circuit 170 and a load current value I2 detected by the current detecting circuit 172.

If the second detecting circuit 140B is combined with the control circuit 14 shown in FIG. 22, then, as shown in FIG. 25, the comparing circuit 164 compares the current value I2 from the current detecting circuit 172 with a predetermined threshold value (current value) I2th, or compares the voltage value V2 from the voltage detecting circuit 170 with a predetermined threshold value (voltage value) V2th, or compares the electric power value P2 from the power detecting circuit 174 with a predetermined threshold value (power value) P2th. The second detecting circuit 140B may comprise only the voltage detecting circuit 170 or the current detecting circuit 172.

Figure 26:
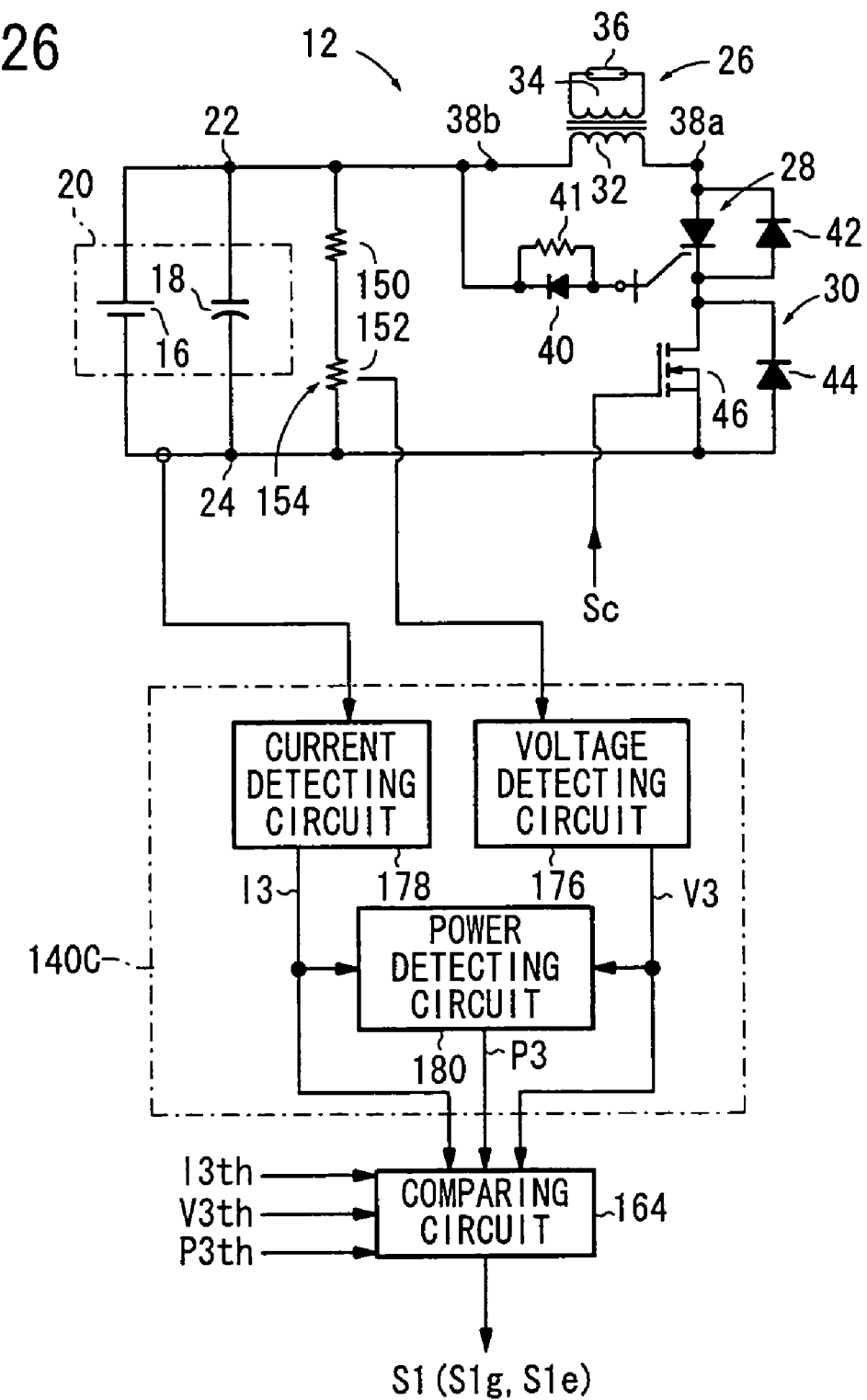
FIG. 26 is a circuit diagram, partly in block form, of a third detecting circuit together with the pulse generating circuit and the comparing circuit.

As shown in FIG. 26, a third detecting circuit 140C, which represents a third specific example of the detecting circuit 140, comprises the series-connected circuit 154, a voltage detecting circuit 176 for detecting a voltage across one 152 of the two resistors 150, 152 of the series-connected circuit 154, a current detecting circuit 178 for detecting a direct current flowing in the pulse generating circuit 12, e.g., a direct current flowing between the negative terminal of the DC power supply unit 20 and the terminal of the capacitor 18, and a power detecting circuit 180 for detecting an electric power value P3 based on a voltage value V3 detected by the voltage detecting circuit 176 and a DC current value I3 detected by the current detecting circuit 178.

If the third detecting circuit 140C is combined with the control circuit 14 shown in FIG. 22, then, as shown in FIG. 26, the comparing circuit 164 compares the current value I3 from the current detecting circuit 178 with a predetermined threshold value (current value) I3th, or compares the voltage value V3 from the voltage detecting circuit 176 with a predetermined threshold value (voltage value) V3th, or compares the electric power value P3 from the power detecting circuit 180 with a predetermined threshold value (power value) P3th. The third detecting circuit 140C may comprise only the voltage detecting circuit 176 or the current detecting circuit 178.

If the second detecting circuit 140B or the third detecting circuit 140C is used in place of the first detecting circuit 140A, the period of time required to achieve a stable discharge in the discharge lamp 36 can be shortened.

Other specific examples of the discharge control circuit 142 will be described below. As shown in FIG. 27, a second discharge control circuit 142B, which represents a second specific example of the discharge control circuit 142, comprises the first discharge control circuit 142A, the duty ratio setting circuit 70, and an address changing circuit 182 for changing the readout address at which data are to be read from the duty ratio information table 72 by the data reading circuit 74 in the duty ratio setting circuit 70, based on the comparison result S1 from the comparing circuit 164 in the first discharge control circuit 142A.

Figure 28A:
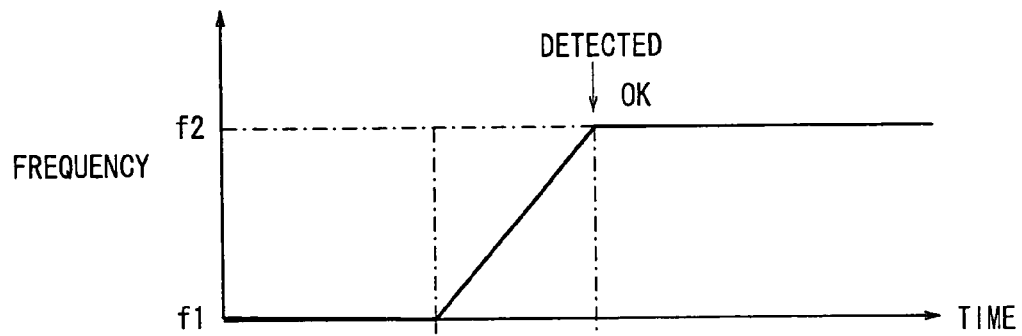
FIG. 28A is a waveform diagram showing the manner in which the first discharge control circuit operates when the normal signal is output from the comparing circuit.
Figure 28B:
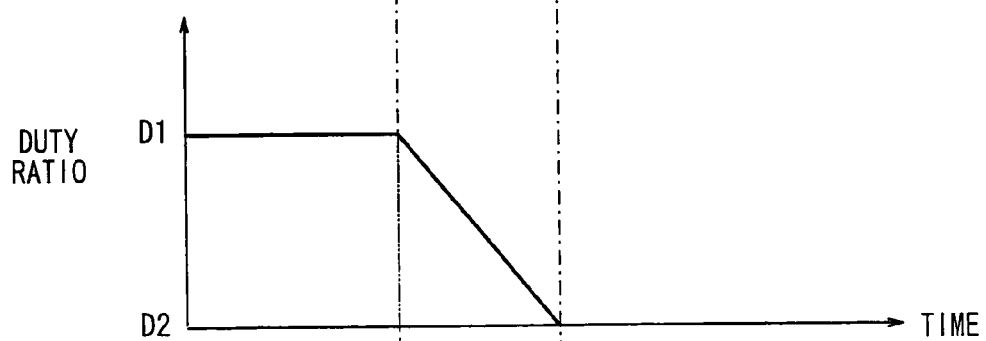
FIG. 28B is a waveform diagram showing the manner in which the second discharge control circuit operates.
Figure 29A:
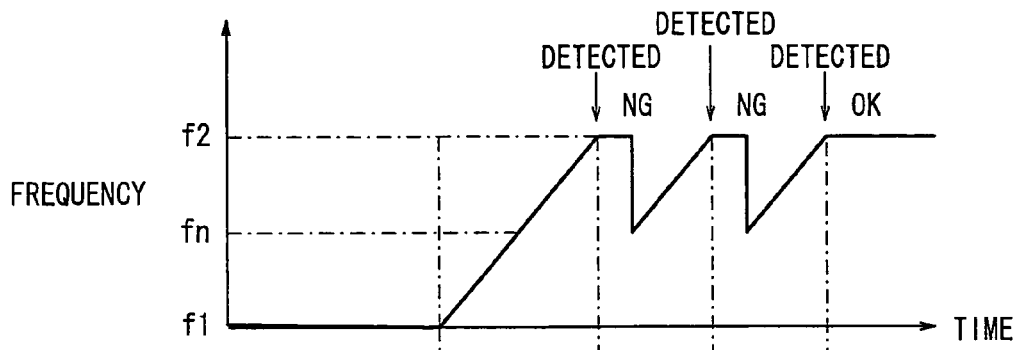
FIG. 29A is a waveform diagram showing the manner in which the first discharge control circuit operates when the abnormal signal is output from the comparing circuit.
Figure 29B:
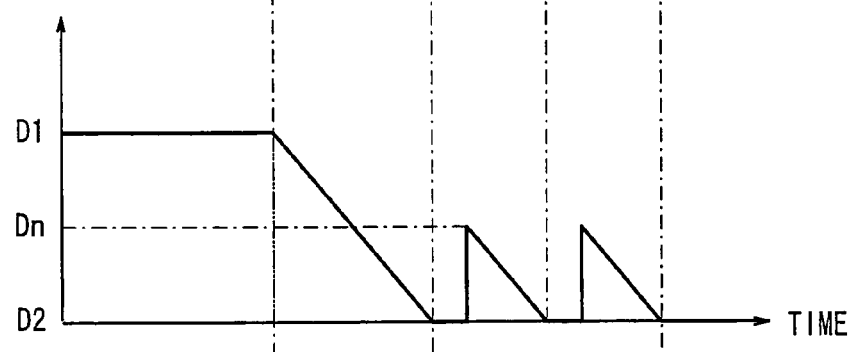
FIG. 29B is a waveform diagram showing the manner in which the second discharge control circuit operates.

As shown in FIGS. 28A, 28B, 29A, 29B, the second semiconductor switch 30 is supplied with the switching pulses Pc at the first frequency f1 and the first duty ratio D1 in the first period T1, causing an arc discharge in the discharge lamp 36 to lower the impedance in the discharge lamp 36. Thereafter, after the initial stage T2a in the second period T2, when the frequency of the switching pulses Pc reaches the second frequency f2, and the duty ratio of the switching pulses Pc reaches the second duty ratio D2, the first detecting circuit 140A detects a current value I1, a voltage value V1, and a power value P1. In FIGS. 28A and 29A, the frequency increase according to the first data characteristic curve, for example, is shown during the initial stage T2a of the second period T2. In FIGS. 28B and 29B, the duty ratio reduction according to the first data characteristic curve, for example, is shown during the initial stage T2a of the second period T2.

Figure 28C:
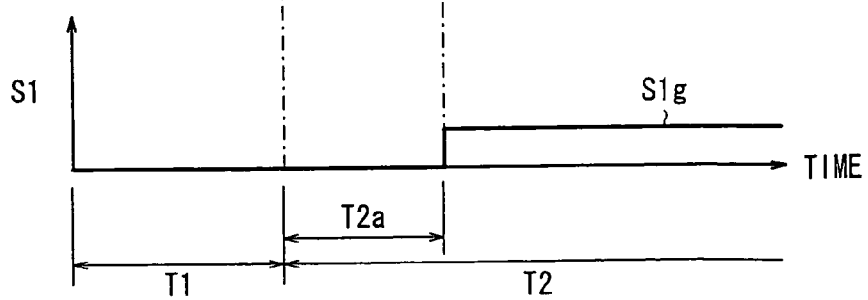
FIG. 28C is a waveform diagram showing the normal signal output from the comparing circuit.

As shown in FIGS. 28A and 28B, if the current value I1 exceeds the predetermined threshold value I1th, or if the voltage value V1 exceeds the predetermined threshold value V1th, or if the power value P1 exceeds the predetermined threshold value P1th, then the comparing circuit 164 judges that the transition to the arc discharge is completed, and outputs a normal signal S1g (e.g., a high-level signal) shown in FIG. 28C. Based on the normal signal S1g from the comparing circuit 164, the data reading circuit 60 in the frequency setting circuit 52 keeps its present output (the maximum value output representing the second frequency f2), and the data reading circuit 74 in the duty ratio setting circuit 70 keeps its present output (the output representing the second duty ratio D2).

Figure 29C:
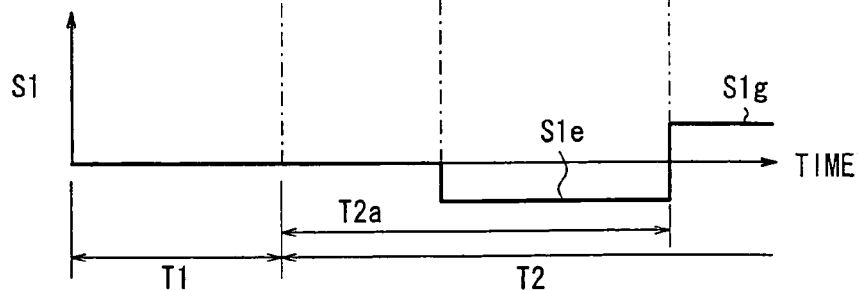
FIG. 29C is a waveform diagram showing the normal signal and the abnormal signal which are output from the comparing circuit.

As shown in FIGS. 29A and 29B, if the current value I1 is equal to or smaller than the predetermined threshold value I1th, or if the voltage value V1 is equal to or smaller than the predetermined threshold value V1th, or if the power value P1 is equal to or smaller than the predetermined threshold value P1th, then the comparing circuit 164 judges that the transition to the arc discharge is not completed, and outputs an error signal S1e (e.g., a low-level signal) shown in FIG. 29C. Based on the error signal S1e from the comparing circuit 164, the address changing circuit 166 in the first discharge control circuit 142A changes the readout address for the frequency information table 58 to an address storing a voltage value which corresponds to a frequency fn while the frequency of the switching pulses Pc is increasing up to the second frequency f2 during the initial stage T2a of the second period T2, as shown in FIG. 29A, and supplies the changed address to the data reading circuit 60. The address changing circuit 166 may change the readout address for the frequency information table 58 to an address storing a voltage value which corresponds to the first frequency f1.

Based on the error signal S1e from the comparing circuit 164, the address changing circuit 182 in the second discharge control circuit 142B changes the readout address for the duty ratio information table 72 to an address storing data which corresponds to a duty ratio Dn while the duty ratio of the switching pulses Pc is decreasing down to the second duty ratio D2 during the initial stage T2a of the second period T2, as shown in FIG. 29B, and supplies the changed address to the data reading circuit 74. The address changing circuit 182 may change the readout address for the duty ratio information table 72 to an address storing data representative of the first duty ratio D1.

The data reading circuit 60 in the frequency setting circuit 52 uses the address supplied from the address changing circuit 166 as a readout start address at which data in the frequency information table 58 start to be read, successively reads the data from the frequency information table 58, and supplies the read data to the voltage control circuit 62.

The data reading circuit 74 in the duty ratio setting circuit 70 uses the address supplied from the address changing circuit 182 as a readout start address at which data in the duty ratio information table 72 start to be read, successively reads the data from the duty ratio information table 72, and supplies the read data to the duty ratio control circuit 76.

Consequently, if the transition to the arc discharge is not successful even when the frequency of the switching pulses Pc reaches the second frequency f2 and the duty ratio of the switching pulses Pc reaches the second duty ratio D2, the readout start address for the frequency information table 58 and the readout start address for the duty ratio information table 72 are changed to cause the frequency of the switching pulses Pc to return to the frequency fn between the first frequency f1 and the second frequency f2 or to the first frequency f1, and also to cause the duty ratio of the switching pulses Pc to return to the duty ratio Dn between the first duty ratio D1 and the second duty ratio D2 or the first duty ratio D1, after which the frequency of the switching pulses Pc increases up to the second frequency f2 and the duty ratio of the switching pulses Pc decreases down to the second duty ratio D2 (retry process).

When the frequency of the switching pulses Pc reaches the second frequency f2 and the duty ratio of the switching pulses Pc reaches the second duty ratio D2 in the retry process, if the current value I1 from the first detecting circuit 140A is still equal to or lower than the predetermined threshold value I1th, or if the voltage value V1 from the first detecting circuit 140A is still equal to or lower than the predetermined threshold value V1th, or the power value P1 from the first detecting circuit 140A is still equal to or lower than the predetermined threshold value P1th, then the above retry process is repeated.

When the frequency of the switching pulses Pc reaches the second frequency f2 and the duty ratio of the switching pulses Pc reaches the second duty ratio D2 in the retry process, if the current value I1 from the first detecting circuit 140A exceeds the predetermined threshold value I1th, or if the voltage value V1 from the first detecting circuit 140A exceeds the predetermined threshold value V1th, or the power value P1 from the first detecting circuit 140A exceeds the predetermined threshold value P1th, then the comparing circuit 164 outputs the normal signal S1g. The retry process is no longer performed, and the second frequency f2 and the second duty ratio D2 are sustained.

A third discharge control circuit 142C, which represents a third specific example of the discharge control circuit 142, will be described below with reference to FIG. 30.

Figure 30:
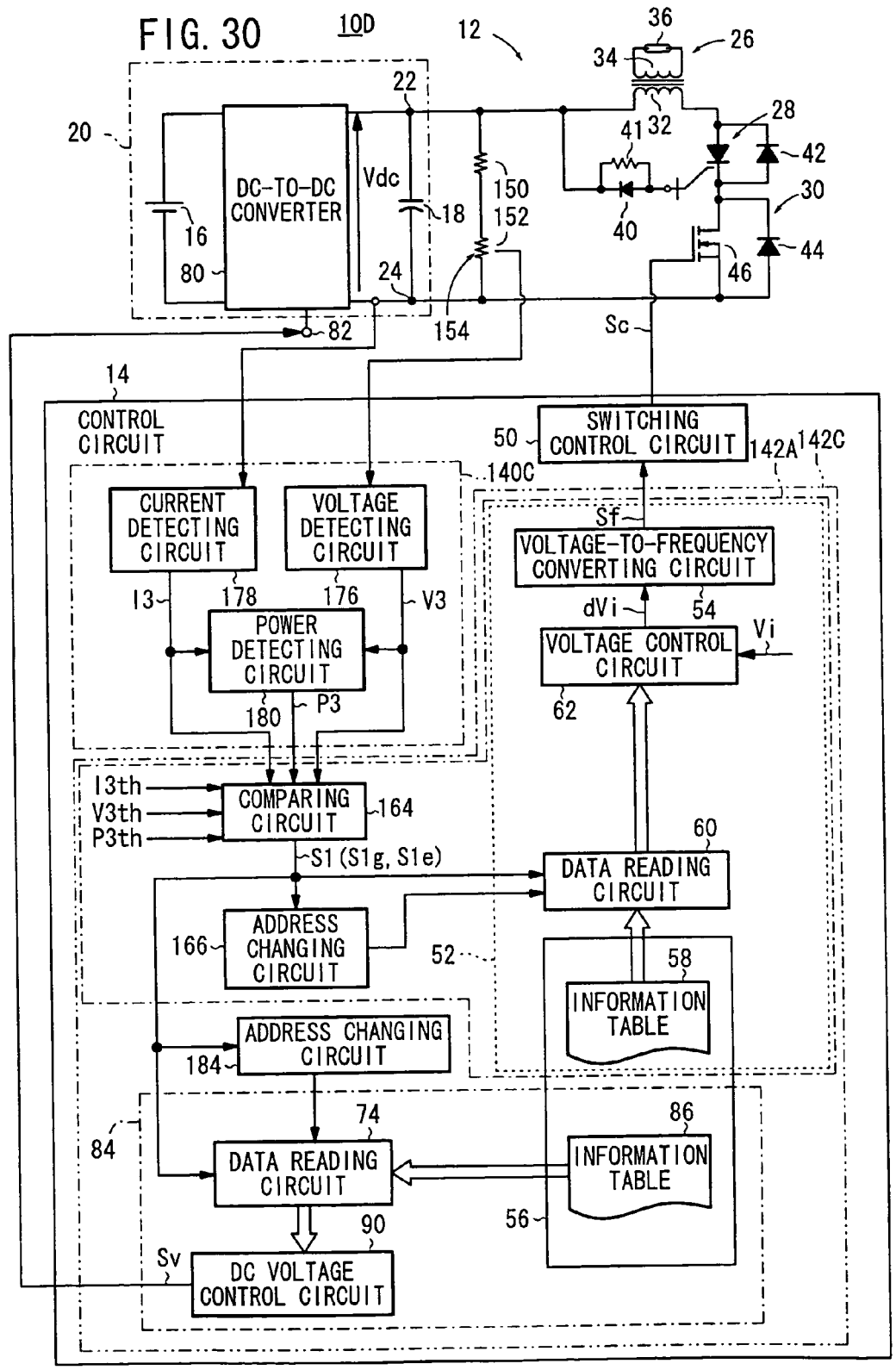
FIG. 30 is a circuit diagram, partly in block form, of the discharge lamp energizing circuit according to the fourth embodiment, particularly a third detecting circuit and a third discharge control circuit thereof.

As shown in FIG. 30, the third discharge control circuit 142C comprises the first discharge control circuit 142A, the DC voltage setting circuit 84, and an address changing circuit 184 for changing the readout address at which data are to be read from the DC voltage information table 86 by the data reading circuit 88 in the DC voltage setting circuit 84, based on the comparison result S1 from the comparing circuit 164 in the first discharge control circuit 142A. In the description of the third discharge control circuit 142C, the third detecting circuit 140C is used as the detecting circuit 140.

Figure 31A:
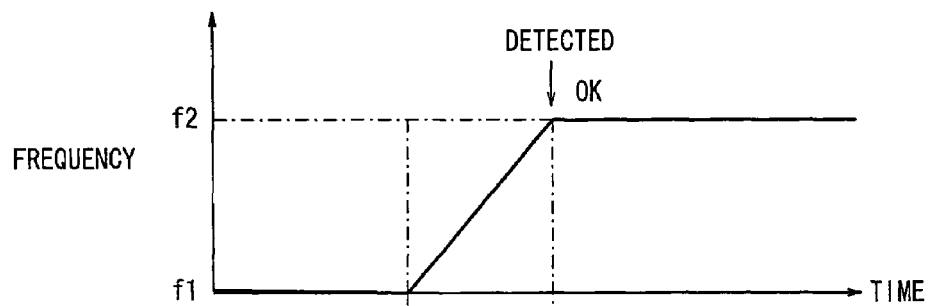
FIG. 31A is a waveform diagram showing the manner in which the first discharge control circuit operates when the normal signal is output from the comparing circuit.
Figure 31B:
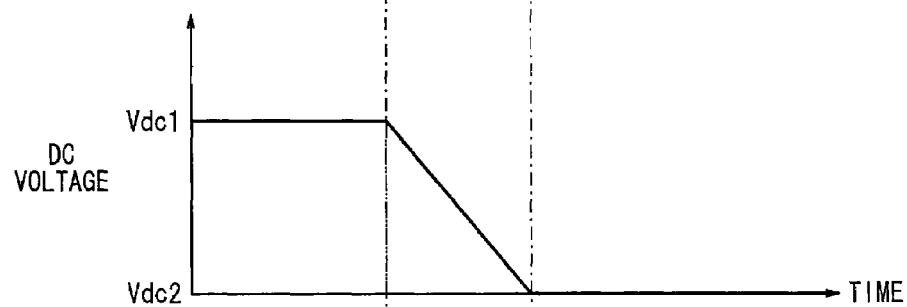
FIG. 31B is a waveform diagram showing the manner in which the third discharge control circuit operates.
Figure 32A:
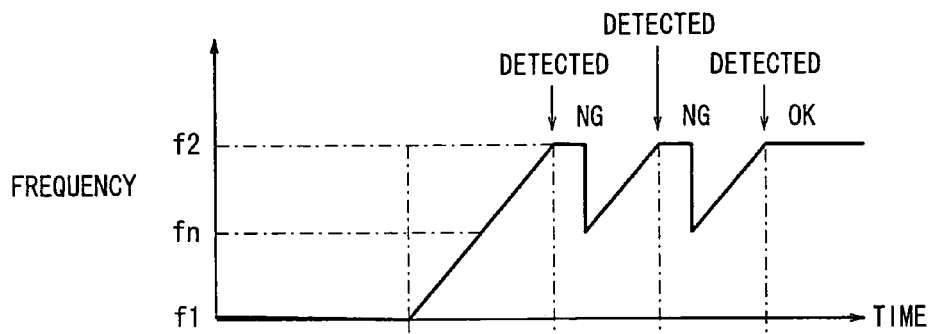
FIG. 32A is a waveform diagram showing the manner in which the first discharge control circuit operates when the abnormal signal is output from the comparing circuit.
Figure 32B:
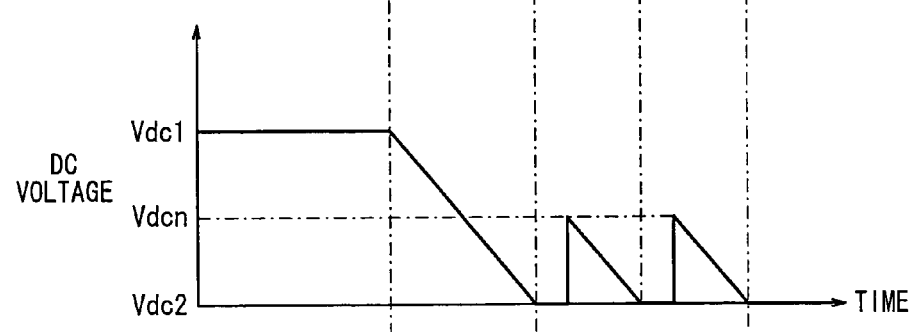
FIG. 32B is a waveform diagram showing the manner in which the third discharge control circuit operates.

As shown in FIGS. 31A, 31B, 32A, 32B, in the first period T1, the DC voltage Vdc from the DC-to-DC converter 80 is set to the first DC voltage Vdc1, and the second semiconductor switch 30 is supplied with the switching pulses Pc at the first frequency f1, causing an arc discharge in the discharge lamp 36 to lower the impedance in the discharge lamp 36. Thereafter, after the initial stage T2a in the second period T2, the DC voltage Vdc from the DC-to-DC converter 80 is set to the second DC voltage Vdc2, and when the frequency of the switching pulses Pc reaches the second frequency f2, the third detecting circuit 140C detects a current value I3, a voltage value V3, and a power value P3. In FIGS. 31A and 32A, the frequency increase according to the first data characteristic curve, for example, is shown during the initial stage T2a of the second period T2. In FIGS. 31B and 32B, the DC voltage reduction according to the first data characteristic curve, for example, is shown during the initial stage T2a of the second period T2.

Figure 31C:
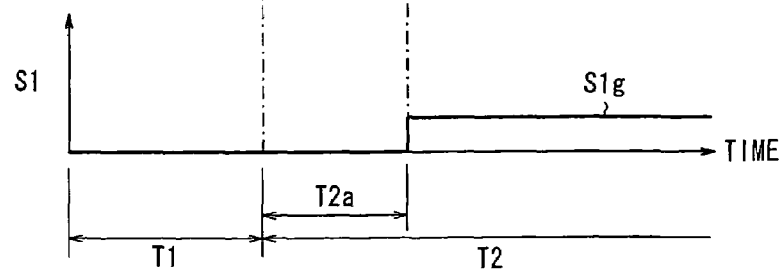
FIG. 31C is a waveform diagram showing the normal signal output from the comparing circuit.

As shown in FIGS. 31A and 31B, if the current value I3 exceeds the predetermined threshold value I3th, or if the voltage value V3 exceeds the predetermined threshold value V3th, or if the power value P3 exceeds the predetermined threshold value P3th, then the comparing circuit 164 judges that the transition to the arc discharge is completed, and outputs a normal signal S1g (e.g., a high-level signal) shown in FIG. 31C. Based on the normal signal S1g from the comparing circuit 164, the data reading circuit 60 in the frequency setting circuit 52 keeps its present output (the maximum value output representing the second frequency f2), and the data reading circuit 88 in the DC voltage setting circuit 84 keeps its present output (the output representing the second DC voltage Vdc2).

Figure 32C:
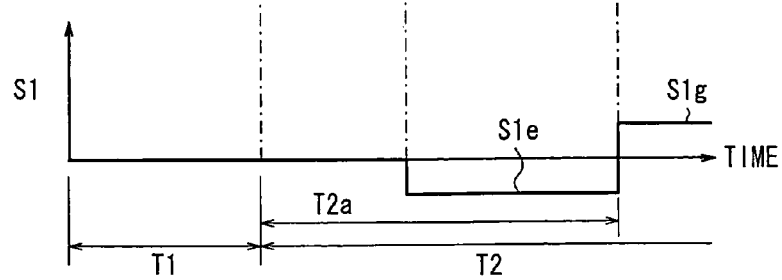
FIG. 32C is a waveform diagram showing the normal signal and the abnormal signal which are output from the comparing circuit.
Figure 36:
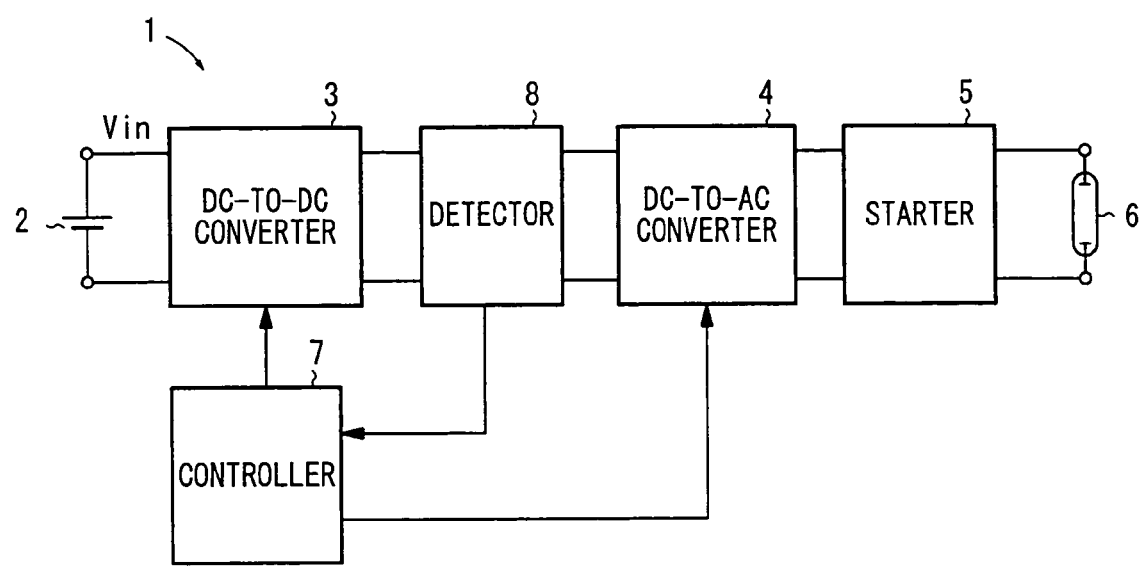
FIG. 36 is a block diagram of a conventional discharge lamp energizing circuit.

As shown in FIGS. 32A and 32B, if the current value I3 is equal to or smaller than the predetermined threshold value I3th, or if the voltage value V3 is equal to or smaller than the predetermined threshold value V3th, or if the power value P3 is equal to or smaller than the predetermined threshold value P3th, then the comparing circuit 164 judges that the transition to the arc discharge is not completed, and outputs an error signal S$e$ (e.g., a low-level signal) shown in FIG. 32C.

Based on the error signal S1$e$ from the comparing circuit 164, the address changing circuit 184 in the third discharge control circuit 142C changes the readout address for the DC voltage information table 86 to an address storing data which corresponds to a DC voltage Vdcn while the DC voltage Vdc of the DC-to-DC converter 80 is decreasing down to the second DC voltage Vdc2 during the initial stage T2$a$ of the second period T2, as shown in FIG. 32B, and supplies the changed address to the data reading circuit 88. The address changing circuit 184 may change the readout address for the DC voltage information table 86 to an address storing data representative of the first DC voltage Vdc1.

Based on the error signal S1$e$ from the comparing circuit 164, the address changing circuit 166 in the first discharge control circuit 142A changes the readout address for the frequency information table 58 to an address storing a voltage value which corresponds to a frequency fn while the frequency of the switching pulses Pc is increasing up to the second frequency f2 during the initial stage T2$a$ of the second period T2, as shown in FIG. 32A, and supplies the changed address to the data reading circuit 60. The address changing circuit 166 may change the readout address for the frequency information table 58 to an address storing a voltage value which corresponds to the first frequency f1.

The data reading circuit 60 in the frequency setting circuit 52 uses the address supplied from the address changing circuit 166 as a readout start address at which data in the frequency information table 58 start to be read, successively reads the data from the frequency information table 58, and supplies the read data to the voltage control circuit 62.

The data reading circuit 88 in the DC voltage setting circuit 84 uses the address supplied from the address changing circuit 184 as a readout start address at which data in the DC voltage information table 86 start to be read, successively reads the data from the DC voltage information table 86, and supplies the read data to the DC voltage control circuit 90.

Consequently, if the transition to the arc discharge is not successful even when the output voltage Vdc of the DC-to-DC converter 80 reaches the second DC voltage Vdc2 and the frequency of the switching pulses Pc reaches the second frequency f2, the readout start address for the frequency information table 58 and the readout start address for the DC voltage information table 86 are changed to cause the frequency of the switching pulses Pc to return to a frequency fn between the first frequency f1 and the second frequency f2 or to the first frequency f1, and also to cause the output voltage Vdc of the DC-to-DC converter 80 to return to a DC voltage Vdcn between the first DC voltage Vdc1 and the second DC voltage Vdc2 or the first DC voltage Vdc1, after which the frequency of the switching pulses Pc increases up to the second frequency f2 and the output voltage Vdc of the DC-to-DC converter 80 decreases down to the second DC voltage Vdc2 (retry process).

When the frequency of the switching pulses Pc reaches the second frequency f2 and the output voltage Vdc of the DC-to-DC converter 80 reaches the second DC voltage Vdc2 in the retry process, if the current value I3 from the third detecting circuit 140C is still equal to or lower than the predetermined threshold value I3th, or if the voltage value V3 from the third detecting circuit 140C is still equal to or lower than the predetermined threshold value V3th, or the power value P3 from the third detecting circuit 140C is still equal to or lower than the predetermined threshold value P3th, then the above retry process is repeated.

When the frequency of the switching pulses Pc reaches the second frequency f2 and the output voltage Vdc of the DC-to-DC converter 80 reaches the second DC voltage Vdc2 in the retry process, if the current value I3 from the third detecting circuit 140C exceeds the predetermined threshold value I3th, or if the voltage value V3 from the third detecting circuit 140C exceeds the predetermined threshold value V3th, or the power value P3 from the third detecting circuit 140C exceeds the predetermined threshold value P3th, then the third detecting circuit 140C outputs the normal signal S1$g$. The retry process is no longer performed, and the second frequency f2 and the second DC voltage Vdc2 are sustained.

The second discharge control circuit 142B may be included in the third discharge control circuit 142C, and in the retry process, the frequency of the switching pulses Pc may be changed linearly or stepwise from the first frequency f1 to the second frequency f2, the duty ratio of the switching pulses Pc may be changed linearly or stepwise from the first duty ratio D1 to the second duty ratio D2, and the DC voltage Vdc of the DC-to-DC converter 80 may be changed linearly or stepwise from the first DC voltage Vdc1 to the second DC voltage Vdc2.

In the first through third specific examples, the retry process is performed. Alternatively, the detected value from the detecting circuit 140 may be compared with a prescribed value, and the frequency of the switching pulses Pc may be controlled based on a comparison result to cause the detected value to settle on the prescribed value under feedback control. Fourth through sixth specific examples for performing such an alternative process will be described below.

As shown in FIG. 33, a fourth discharge control circuit 142D, which represents a fourth specific example of the discharge control circuit 142, is of essentially the same structure as the first discharge control circuit 142A described above, but differs therefrom as follows:

The fourth discharge control circuit 142D has a differential detecting circuit 190 in place of the comparing circuit 164. The differential detecting circuit 190 is a circuit for outputting a differential value dS between the detected value from the first detecting circuit 140A and the prescribed value. For example, the differential detecting circuit 190 outputs a differential value dSI between the current value I1 detected by the current detecting circuit 160 and a prescribed current value I1$b$, or a differential value dSV between the voltage value V1 detected by the voltage detecting circuit 158 and a prescribed voltage value V1$b$, or a differential value dSP between the power value P1 detected by the power detecting circuit 162 and a prescribed power value P1$b$.

The current value I1, the voltage value V1, and the power value P1 detected by the first detecting circuit 140A when a stable arc discharge is sustained in the discharge lamp 36 are selected as the above prescribed values, i.e., the current value I1$b$, the voltage value V1$b$, and the power value P1$b$. The prescribed values, i.e., the current value I1$b$, the voltage value V1$b$, and the power value P1$b$, are selected depending on the size of the discharge lamp 36, the circuit constants of the pulse generating circuit 12, the types and characteristics of the first semiconductor switch 28 and the second semiconductor switch 30 which are used.

The voltage control circuit 62 in the frequency setting circuit 52 modulates the input voltage Vi based on the data read by the data reading circuit 60 and outputs the modulated voltage as the control voltage dVi, as described above. The voltage control circuit 62 also modulates the input voltage Vi based on the differential value dS (dSI, dSV, dSP) from the differential detecting circuit 190, and outputs the modulated voltage as the control voltage dVi.

According to the fourth specific example, therefore, the frequency of the switching pulses Pc is controlled based on the differential value dS between the detected value from the first detecting circuit 140A and the prescribed value for thereby causing the detected value to settle on the prescribed value under feedback control to keep a stable arc discharge in the discharge lamp 36.

As shown in FIG. 34, a fifth discharge control circuit 142E, which represents a fifth specific example of the discharge control circuit 142, is of essentially the same structure as the second discharge control circuit 142B described above, but differs therefrom as follows:

The fifth discharge control circuit 142E has a differential detecting circuit 190 in place of the comparing circuit 164. The differential detecting circuit 190 is identical to the differential detecting circuit 190 in the fourth discharge control circuit 142D, and will not be described in detail below.

The voltage control circuit 62 in the frequency setting circuit 52 modulates the input voltage Vi based on the data read by the data reading circuit 60 and outputs the modulated voltage as the control voltage dVi, as described above. The voltage control circuit 62 also modulates the input voltage Vi based on the differential value dS (dSI, dSV, dSP) from the differential detecting circuit 190, and outputs the modulated voltage as the control voltage dVi.

The duty ratio control circuit 76 in the duty ratio setting circuit 70 outputs the duty ratio control signal Sd depending on the data read by the data reading circuit 74, as described above. The duty ratio control circuit 76 also outputs the duty ratio control signal Sd depending on the differential value dS (dSI, dSV, dSP) from the differential detecting circuit 190.

According to the fifth specific example, therefore, the frequency and the duty ratio of the switching pulses Pc are controlled based on the differential value dS between the detected value from the first detecting circuit 140A and the prescribed value for thereby causing the detected value to settle on the prescribed value under feedback control to keep a stable arc discharge in the discharge lamp 36.

As shown in FIG. 35, a sixth discharge control circuit 142F, which represents a sixth specific example of the discharge control circuit 142, is of essentially the same structure as the third discharge control circuit 142C described above, but differs therefrom as follows:

The sixth discharge control circuit 142F has a differential detecting circuit 190 in place of the comparing circuit 164. The differential detecting circuit 190 is identical to the differential detecting circuit 190 in the fourth discharge control circuit 142D, and will not be described in detail below.

The voltage control circuit 62 in the frequency setting circuit 52 modulates the input voltage Vi based on the data read by the data reading circuit 60 and outputs the modulated voltage as the control voltage dVi, as described above. The voltage control circuit 62 also modulates the input voltage Vi based on the differential value dS (dSI, dSV, dSP) from the differential detecting circuit 190, and outputs the modulated voltage as the control voltage dVi.

The DC voltage control circuit 90 in the DC voltage setting circuit 84 outputs the DC voltage control signal Sv depending on the data read by the data reading circuit 88, as described above. The DC voltage control circuit 90 also outputs the DC voltage control signal Sv depending on the differential value dS (dSI, dSV, dSP) from the differential detecting circuit 190.

According to the sixth specific example, therefore, the frequency of the switching pulses Pc and the DC voltage Vdc of the DC-to-DC converter 80 are controlled based on the differential value dS between the detected value from the third detecting circuit 140C and the prescribed value for thereby causing the detected value to settle on the prescribed value under feedback control to keep a stable arc discharge in the discharge lamp 36.

The second discharge control circuit 142B may be included in the sixth discharge control circuit 142F, and in the feedback control process, the frequency of the switching pulses Pc, the duty ratio of the switching pulses Pc, and the DC voltage Vdc of the DC-to-DC converter 80 may be controlled to equalize the detected value to the prescribed value.

Although certain preferred embodiments of the present invention have been shown and described in detail, it should be understood that various changes and modifications may be made therein without departing from the scope of the appended claims.

What is claimed is:

1. A circuit for outputting a succession of positive and negative pulses to energize a discharge lamp, comprising:
   a pulse generating circuit having a DC power supply unit, and a transformer and at least one semiconductor switch which are connected in series across said DC power supply unit, wherein said pulse generating circuit outputs high-voltage pulses to said discharge lamp; and
   a control circuit for supplying energizing pulses for turning on and off said semiconductor switch;
   wherein said transformer has a secondary winding with said discharge lamp connected thereacross; and
   said control circuit controls said energizing pulses to output said high-voltage pulses at a first frequency to cause said discharge lamp to develop an initial discharge therein during a first period, and controls said energizing pulses to output said high-voltage pulses at a second frequency which is higher than said first frequency to develop a substantially steady discharge in said discharge lamp during a second period subsequent to said first period.

2. A circuit according to claim 1, wherein said control circuit comprises:
   a detecting circuit for detecting a current value flowing in said pulse generating circuit and/or a voltage value generated by said pulse generating circuit during an initial stage of said second period; and
   a discharge control circuit for controlling said discharge lamp to develop the substantially steady discharge therein during said second period, based on the value detected by said detecting circuit.

3. A circuit according to claim 2, wherein said discharge control circuit has:
   a frequency setting circuit for setting an output frequency for said energizing pulses;
   wherein said frequency setting circuit sets the output frequency for said energizing pulses so that the frequency of said high-voltage pulses is set to a frequency lower than said second frequency if the current value detected by said detecting circuit is equal to or lower than a predetermined threshold value, and subsequently sets the output frequency for said energizing pulses so that said frequency lower than said second frequency changes to said second frequency.

4. A circuit according to claim 2, wherein said discharge control circuit has:
- a frequency setting circuit for setting an output frequency for said energizing pulses;
- wherein said frequency setting circuit controls the output frequency for said energizing pulses so that the current value detected by said detecting circuit becomes a prescribed current value.

5. A circuit according to claim 2, wherein said discharge control circuit has:
- a frequency setting circuit for setting said second frequency as an output frequency for said energizing pulses;
- wherein said frequency setting circuit sets the output frequency for said energizing pulses so that the frequency of said high-voltage pulses is set to a frequency lower than said second frequency if the voltage value detected by said detecting circuit is equal to or lower than a predetermined threshold value, and subsequently sets the output frequency for said energizing pulses so that said frequency lower than said second frequency changes to said second frequency.

6. A circuit according to claim 2, wherein said discharge control circuit has:
- a frequency setting circuit for setting an output frequency for said energizing pulses;
- wherein said frequency setting circuit controls the output frequency for said energizing pulses so that the voltage value detected by said detecting circuit becomes a prescribed voltage value.

7. A circuit according to claim 2, wherein said discharge control circuit has:
- a frequency setting circuit for setting said second frequency as an output frequency for said energizing pulses;
- wherein said frequency setting circuit sets the output frequency for said energizing pulses so that the frequency of said high-voltage pulses is set to a frequency lower than said second frequency if a power value based on the current value and the voltage value detected by said detecting circuit is equal to or lower than a predetermined threshold value, and subsequently sets the output frequency for said energizing pulses so that said frequency lower than said second frequency changes to said second frequency.

8. A circuit according to claim 2, wherein said discharge control circuit has:
- a frequency setting circuit for setting an output frequency for said energizing pulses;
- wherein said frequency setting circuit controls the output frequency for said energizing pulses so that a power value based on the current value and the voltage value detected by said detecting circuit becomes a prescribed power value.

9. A circuit according to claim 2, wherein said discharge control circuit has:
- a duty ratio setting circuit for setting the duty ratio of said energizing pulses, which represents the ratio of turned-on and turned-off periods of said semiconductor switch, to a predetermined duty ratio;
- wherein said duty ratio setting circuit sets the duty ratio of said energizing pulses to a duty ratio representing a longer turned-on period than said predetermined duty ratio if the current value detected by said detecting circuit is equal to or smaller than a predetermined threshold value, and subsequently changes the duty ratio representing the longer turned-on period than said predetermined duty ratio to said predetermined duty ratio.

10. A circuit according to claim 2, wherein said discharge control circuit has:
- a duty ratio setting circuit for setting the duty ratio of said energizing pulses, which represents the ratio of turned-on and turned-off periods of said semiconductor switch, to a predetermined duty ratio;
- wherein said duty ratio setting circuit sets the duty ratio of said energizing pulses to a duty ratio representing a longer turned-on period than said predetermined duty ratio if the voltage value detected by said detecting circuit is equal to or smaller than a predetermined threshold value, and subsequently changes the duty ratio representing the longer turned-on period than said predetermined duty ratio to said predetermined duty ratio.

11. A circuit according to claim 2, wherein said discharge control circuit has:
- a duty ratio setting circuit for setting the duty ratio of said energizing pulses, which represents the ratio of turned-on and turned-off periods of said semiconductor switch, to a predetermined duty ratio;
- wherein said duty ratio setting circuit sets the duty ratio of said energizing pulses to a duty ratio representing a longer turned-on period than said predetermined duty ratio if a power value based on the current value and the voltage value detected by said detecting circuit is equal to or smaller than a predetermined threshold value, and subsequently changes the duty ratio representing the longer turned-on period than said predetermined duty ratio to said predetermined duty ratio.

12. A circuit according to claim 2, wherein said discharge control circuit has:
- a voltage setting circuit for setting the DC voltage of said DC power supply unit to a predetermined DC voltage;
- wherein if the current value detected by said detecting circuit is different from a prescribed current value, said voltage setting circuit controls the DC voltage so that the current value becomes the prescribed current value.

13. A circuit according to claim 2, wherein said discharge control circuit has:
- a voltage setting circuit for setting the DC voltage of said DC power supply unit to a predetermined DC voltage;
- wherein if the voltage value detected by said detecting circuit is different from a prescribed voltage value, said voltage setting circuit controls the DC voltage so that the voltage value becomes the prescribed voltage value.

14. A circuit according to claim 2, wherein said discharge control circuit has:
- a voltage setting circuit for setting the DC voltage of said DC power supply unit to a predetermined DC voltage;
- wherein if a power value based on the voltage value and the current value detected by said detecting circuit is different from a prescribed power value, said voltage setting circuit controls the DC voltage so that the power value becomes the prescribed power value.

15. A circuit according to claim 1, wherein said pulse generating circuit comprises said transformer, a first semiconductor switch and a second semiconductor switch which are connected in series across said DC power supply unit;
- said transformer includes a primary winding having a terminal connected to an anode of said first semiconductor switch and another terminal connected to a gate of said first semiconductor switch through a diode;
- said diode has a cathode connected to the other terminal of said primary winding and an anode connected to the gate of said first semiconductor switch; and said control circuit supplies said energizing pulses for turning on and off said second semiconductor switch.

16. A circuit according to claim 15, wherein an induced energy is stored in said transformer when said second semiconductor switch is turned on thereby to render said first semiconductor switch conductive, and a discharge is developed in said discharge lamp when said second semiconductor switch is turned off thereby to turn off said first semiconductor switch.

17. A circuit according to claim 1, wherein said transformer has a primary winding with a tap connection terminal thereon;
   said pulse generating circuit has:
   a first semiconductor switch connected between a negative terminal of a DC power supply and said tap connection terminal for drawing a current flowing through said primary winding into said DC power supply;
   a second semiconductor switch connected between a terminal of said primary winding and a positive terminal of said DC power supply; and
   a third semiconductor switch connected between another terminal of said primary winding and the positive terminal of said DC power supply ; and
   wherein said control circuit supplies said energizing pulses for turning on and off said second semiconductor switch and said third semiconductor switch.

18. A circuit according to claim 1, wherein said transformer has a primary winding with a tap connection terminal thereon;
   said pulse generating circuit has:
   a diode forward-connected between a positive terminal of a DC power supply and said tap connection terminal;
   a first semiconductor switch connected between a terminal of said primary winding and a negative terminal of said DC power supply for allowing a current from said DC power supply to flow from said tap connection terminal to said terminal of said primary winding;
   a second semiconductor switch for turning on and off said first semiconductor switch;
   a third semiconductor switch connected between another terminal of said primary winding and the negative terminal of said DC power supply for allowing a current from said DC power supply to flow from said tap connection terminal to said other terminal of said primary winding; and
   a fourth semiconductor switch for turning on and off said third semiconductor switch;
   wherein said control circuit supplies said energizing pulses for turning on and off said second semiconductor switch and said fourth semiconductor switch.

19. A method of energizing a discharging lamp with a discharge lamp energizing circuit having a pulse generating circuit having a DC power supply unit, and a transformer and at least one semiconductor switch which are connected in series across said DC power supply unit, wherein said pulse generating circuit outputs high-voltage pulses to said discharge lamp, and a control circuit for supplying energizing pulses for turning on and off said semiconductor switch, wherein said transformer has a secondary winding with said discharge lamp connected thereacross, said method comprising the steps of:
   (a) outputting said high-voltage pulses at a first frequency to cause said discharge lamp to develop an initial discharge therein during a first period; and
   (b) outputting said high-voltage pulses at a second frequency which is higher than said first frequency to develop a substantially steady discharge in said discharge lamp during a second period subsequent to said first period.

20. A method according to claim 19, wherein said step (b) comprises the steps of:
   detecting a current value flowing in said pulse generating circuit and/or a voltage value generated by said pulse generating circuit during an initial stage of said second period; and
   controlling said discharge lamp to develop the substantially steady discharge therein during said second period based on the detected value.

* * * * *